United States Patent
Feng

(10) Patent No.: US 11,160,085 B2
(45) Date of Patent: *Oct. 26, 2021

(54) METHOD AND DEVICE FOR DETERMINING TRANSMISSION RESOURCE FOR DEVICE-TO-DEVICE COMMUNICATIONS

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/941,459

(22) Filed: Jul. 28, 2020

(65) Prior Publication Data

US 2020/0359370 A1   Nov. 12, 2020

Related U.S. Application Data

(63) Continuation of application No. 16/071,442, filed as application No. PCT/CN2016/077723 on Mar. 29, 2016, now Pat. No. 10,764,897.

(51) Int. Cl.
*H04W 72/04* (2009.01)
*H04W 92/18* (2009.01)

(52) U.S. Cl.
CPC .......... *H04W 72/048* (2013.01); *H04W 92/18* (2013.01)

(58) Field of Classification Search
CPC ... H04W 72/048; H04W 92/18; H04W 76/14; H04W 72/02; H04W 8/005; H04W 24/10; H04W 72/0493
See application file for complete search history.

(56) References Cited

U.S. PATENT DOCUMENTS

| 2009/0016229 A1 | 1/2009 | Wu |
| 2013/0252654 A1 | 9/2013 | Dimou |

(Continued)

FOREIGN PATENT DOCUMENTS

| CN | 103533529 A | 1/2014 |
| CN | 103916968 A | 7/2014 |

(Continued)

OTHER PUBLICATIONS

First Office Action of the Taiwanese application No. 106110411, dated Aug. 20, 2020.

(Continued)

*Primary Examiner* — Afshawn M Towfighi
(74) *Attorney, Agent, or Firm* — Ladas & Parry, LLP

(57) ABSTRACT

The invention discloses a method and device for determining a transmission resource for device-to-device (D2D) communications and capable of enhancing D2D communication quality. The method comprises: determining a plurality of transmission resource sets, wherein each of the plurality of transmission resource sets comprises at least one transmission resource block and has a corresponding distance threshold; and determining, from the plurality of transmission resource sets, and according to current location information of first terminal equipment and distance thresholds of the plurality of transmission resource sets, a target transmission resource set for the first terminal equipment to perform D2D communication.

20 Claims, 5 Drawing Sheets

(56) References Cited

U.S. PATENT DOCUMENTS

| | | | |
|---|---|---|---|
| 2015/0103789 A1* | 4/2015 | Tanaka | H04W 72/0426 370/329 |
| 2015/0373719 A1 | 12/2015 | Xu | |
| 2016/0004486 A1 | 1/2016 | Terashima et al. | |
| 2016/0014790 A1* | 1/2016 | Takehana | H04W 72/085 370/329 |
| 2016/0037570 A1 | 2/2016 | Guo | |
| 2016/0044486 A1* | 2/2016 | Pais | H04W 8/005 370/252 |
| 2018/0160418 A1* | 6/2018 | Luo | H04W 72/1263 |

FOREIGN PATENT DOCUMENTS

| | | |
|---|---|---|
| CN | 103974431 A | 8/2014 |
| CN | 104066069 A | 9/2014 |
| CN | 104066112 A | 9/2014 |
| CN | 104303585 A | 1/2015 |
| CN | 104956757 A | 9/2015 |
| EP | 2955967 A | 12/2015 |
| EP | 2983432 A1 | 2/2016 |
| JP | 2012518374 A | 8/2012 |
| JP | 2014013278 A | 1/2014 |
| JP | 2014183592 A | 9/2014 |
| JP | 2016509426 A | 3/2016 |
| WO | 2013170760 A1 | 11/2013 |
| WO | 2014034090 A | 3/2014 |
| WO | 2014165386 A2 | 10/2014 |
| WO | 2014198197 A1 | 12/2014 |
| WO | 2014206302 A1 | 12/2014 |
| WO | 2015084483 A1 | 6/2015 |
| WO | 2016022849 A1 | 2/2016 |
| WO | 2016034198 A1 | 3/2016 |

OTHER PUBLICATIONS

First Office Action of the Indian application No. 201817034794, dated Aug. 20, 2020.
Decision of Refusal of the Japanese application No. 2018-538709, dated Aug. 11, 2020.
Corrected Notice of Allowance of the U.S. Appl. No. 16/071,442, dated Jul. 29, 2020.
First Office Action of the Chinese application No. 201680080253.1, dated Mar. 19, 2021.
Second Office Action of the Israeli application No. 260864, dated Feb. 28, 2021.
International Search Report in the international application No. PCT/CN2016/077723, dated Jan. 4, 2017.
Written Opinion of the International Search Authority in the international application No. PCT/CN2016/077723, dated Jan. 4, 2017.
Lenovo: "Mechanisms for V2V resource allocation", 3GPP Draft; R1-161014, 3rd Generation Partnership Project (3GPP), Mobile Competence Centre, 650, Route Deslucioles; F-06921 Sophia-Antipolis Cedex; France vol. RAN WG1, No. St Julian's, Malta; Feb. 15, 2016-Feb. 19, 2016 Feb. 14, 2016 (Feb. 14, 2016), XP051054318, Retrieved from the Internet URL: http ://www.3gpp.org/ftp/Meetings 3GPPSYNC/ RANI / Docs/ [retrieved on Feb. 14, 2016] * pp. 1-7.
Notice of Allowance of the U.S. Appl. No. 16/071,442, dated Apr. 23, 2020.
International Preliminary Report on Patentability issued for PCT/CN2016/077723 dated Oct. 2, 2018.
Nokia Networks et al: "On resource control / selection mechanisms for V2V operation", 3GPP Draft; R1-160909, 3rd Generationpartnership Project (3GPP), Mobilecompetence Centre; 650, Route Deslucioles ; F-06921 Sophia-Antipolis Cedex; France vol. RAN WG1, No. St Julian's, Malta; Feb. 15, 2016-Feb. 19, 2016 Feb. 5, 2016 (Feb. 5, 2016), XP051063932, Retrieved from the Internet: URL:http://www.3gpp.org/ ftp /tsg ran/WGI RLI/TSGRI 84/Docs/ [retrieved on Feb. 5, 2016] pp. 1-5.
Intel Corporation, "Support of geo-based transmission schemes for V2V communication", 3GPP TSG-RAN WG1#84 R1-160431, Feb. 15, 2016.
LG Electronics Inc., "TP for TR 36.885 on V2X SI", 3GPP TSG-RAN WG3#91 R3-160568, Feb. 15, 2016.
ZTE, "Enhancement of resource allocation and procedure for V2V", 3GPP TSG-RAN WG1#83 R1-157777, Nov. 15, 2015.
Supplementary Partial European Search Report in European application No. 16895854.4, dated Oct. 25, 2018.
First Office Action of the Israeli application No. 260864, dated Jan. 23, 2020.
First Office Action of the Japanese application No. 2018-538709, dated Dec. 13, 2019.
Non-final Office Action of the U.S. Appl. No. 16/071,442, dated Jan. 17, 2020.
First Office Action of the European application No. 16895854.4, dated Jul. 10, 2020.
Supplementary European Search Report in the European application No. 16895854.4, dated Jan. 28, 2019.
SONY: "Resource pool configurations on LTE sidelink for V2V services",3GPP Draft; R1-160679 Resource Pool Configurations On LTE-Sidelink for V2V Services, 3rd Generation Partnership Project (3GPP), Mobile Competence Centre; 650, Route Des Lucioles; F-06921 Sophia-Anti, vol. RAN WG1, No. St Julian's, Malta; Feb. 15, 2016-201602196 Feb. 2016 (Feb. 6, 2016), XP051064307, Retrieved from the Internet: URL: http: //www.3gpp . org/ ftp/ tsg ran/ WG1 RL1/ TSGR1 84/ Docs/[retrieved on Feb. 6, 2016]* proposal 2 *, pp. 1-3.

* cited by examiner

METHOD AND DEVICE FOR DETERMINING TRANSMISSION RESOURCE FOR DEVICE-TO-DEVICE COMMUNICATIONS

CROSS REFERENCE TO RELATED APPLICATIONS

This application is a continuation of U.S. application Ser. No. 16/071,442, filed on Jul. 19, 2018, which is a US national phase application based upon International Application No. PCT/CN2016/077723, filed on Mar. 29, 2016. The entire contents of the above applications are incorporated herein by reference in their entireties.

TECHNICAL FIELD

Embodiments of the disclosure relate to the field of communications, and more particularly, to a method and device for determining transmission resources for Device to Device (D2D) communication.

BACKGROUND

In a 3rd Generation Partnership Project (3GPP) protocol, D2D communication has been standardized. Resource allocation for D2D communication may be implemented in the two manners. In the first manner, network equipment allocates transmission resources for D2D communication. This manner is applied to the condition of existence of coverage of a cellular network. In the second manner, the terminal equipment autonomously selects transmission resources. For example, the terminal equipment may randomly select one resource allocation pattern from multiple pre-specified resource allocation resources and determine the transmission resources adopted for D2D communication according to the selected resource allocation pattern. This manner is mainly applied to the condition of no coverage of the cellular network.

With further development of a communication technology, a Vehicle to Vehicle (V2V) technology and a Vehicle to X (V2X) technology become research hotspots. In V2X, X may generally refer to any equipment with a wireless receiving and sending capability, for example, but not limited to, a wireless device moving at a low speed, vehicle-mounted equipment moving at a high speed or a network control node with a wireless transmitting and receiving capability. The characteristic of high movement speed of the vehicle-mounted equipment makes the resource allocation manners in a conventional art inapplicable to the V2V technology and the V2X technology. At present, there is yet no technical solution of how to determine transmission resources for D2D communication in the V2V/V2X technology.

SUMMARY

The embodiments of the disclosure provide a method and device for determining transmission resources for D2D communication, which may improve D2D communication quality.

A first aspect provides a method for determining transmission resources for D2D communication, which may include that: multiple transmission resource sets are determined, wherein each of the multiple transmission resource sets may include at least one transmission resource block, and each transmission resource set may have a corresponding distance threshold; and a target transmission resource set for D2D communication of first terminal equipment is determined from the multiple transmission resource sets according to location information of the first terminal equipment and the distance thresholds of the multiple transmission resource sets.

Therefore, according to the method for determining the transmission resources for D2D communication in the embodiments of the disclosure, the distance thresholds are defined for the transmission resource sets, distance information between the first terminal equipment and terminal equipment presently corresponding to the transmission resource sets is determined according to the location information of the first terminal equipment, whether the first terminal equipment can adopt the transmission resource sets for D2D or not is further determined according to the distance information, and in such a manner, the target transmission resource set for the first terminal equipment may be determined from the multiple resource sets. In addition, compared with determination of the target transmission resource set for the first terminal equipment on the basis of an absolute location of the first terminal equipment, determination of the target transmission resource set for the first terminal equipment is implemented according to distances between the first terminal equipment and the other terminal equipment in the embodiments of the disclosure, so that frequent change of the target transmission resource set for the first terminal equipment in a scenario where a location of the first terminal equipment is changed faster (for example, the first terminal equipment is specifically a vehicle traveling fast or vehicle-mounted equipment) may be avoided, and D2D communication quality is further improved.

In addition, in a related art, when the first terminal equipment autonomously selects the transmission resource set adopted by it, it is necessary to learn about and store a corresponding relationship between a geographical location or geographical region and a transmission resource set in advance. While in the embodiments of the disclosure, the first terminal equipment selects the transmission resource set according to the distances with the other terminal equipment, and a corresponding relationship between a location or distance and a transmission resource set is not required to be stored in advance, so that memory resources of the terminal equipment are saved.

Optionally, responsive to a determination that the first terminal equipment can adopt a first transmission resource set for D2D communication, the first transmission resource set may be determined as the target transmission resource set for the first terminal equipment.

Optionally, whether the first terminal equipment can adopt the first transmission resource set for D2D communication or not may be determined according to the location information of the first terminal equipment and a distance threshold of the first transmission resource set.

Optionally, a present distance between the first terminal equipment and each of at least one second terminal equipment may be determined according to the location information of the first terminal equipment and location information of each of the at least one second terminal equipment corresponding to the first transmission resource set, and whether the first terminal equipment can adopt the first transmission resource set for D2D communication or not may be determined according to the present distance between the first terminal equipment and each of the at least one second terminal equipment and the distance threshold of the first transmission resource set.

Optionally, statistical distance information between the location information of the first terminal equipment and the at least one second terminal equipment may be determined according to the present distance between the first terminal equipment and each of the at least one second terminal equipment, and whether the first terminal equipment can adopt the first transmission resource set for D2D communication or not may be determined according to the statistical distance information and the distance threshold of the first transmission resource set. For example, the statistical distance information includes a maximum distance, and at this moment, when the maximum distance between the first terminal equipment and the at least one second terminal equipment is less than or equal to the distance threshold of the first transmission resource set, it may be determined that the first terminal equipment can adopt transmission resources in the first transmission resource set for D2D communication.

In a first possible implementation of the first aspect, each of the multiple transmission resource sets may further have a corresponding relative movement speed threshold; and the operation that the target transmission resource set for D2D communication of the first terminal equipment is determined from the multiple transmission resource sets according to the location information of the first terminal equipment and the distance thresholds of the multiple transmission resource sets may include that: the target transmission resource set for D2D communication of the first terminal equipment is determined from the multiple transmission resource sets according to the location information and movement speed information of the first terminal equipment and the distance thresholds and relative movement speed thresholds of the multiple transmission resource sets.

Optionally, whether the first terminal equipment can adopt the first transmission resource set for D2D communication or not may be determined according to the movement speed information of the first terminal equipment and the relative movement speed threshold of the first transmission resource set when the location information of the first terminal equipment meets the distance threshold of the first transmission resource set.

In such a manner, the target transmission resource set for the first terminal equipment is determined according to the location information and movement speed information of the first terminal equipment, and then a frequency by which the terminal equipment triggers transmission resource set selection may further be reduced, so that the D2D communication quality is further improved.

In combination with the abovementioned possible implementation, in a second possible implementation of the first aspect, the operation that the target transmission resource set for D2D communication of the first terminal equipment is determined from the multiple transmission resource sets according to the location information and movement speed information of the first terminal equipment and the distance thresholds and relative movement speed thresholds of the multiple transmission resource sets may include that: location information and movement speed information of each of at least one second terminal equipment corresponding to a first transmission resource set are acquired, each of the at least one second terminal equipment adopting transmission resources in the first transmission resource set for D2D communication and the multiple transmission resource sets including the first transmission resource set; statistical distance information between the first terminal equipment and the at least one second terminal equipment is determined according to the location information of the first terminal equipment and the location information of each of the at least one second terminal equipment, wherein the statistical distance information may include at least one of a maximum distance, an average distance or a distance average variance; statistical relative movement speed information between the first terminal equipment and the at least one second terminal equipment is determined according to the movement speed information of the first terminal equipment and the movement speed information of each of the at least one second terminal equipment, wherein the statistical relative movement speed information may include at least one of a maximum relative movement speed, an average relative movement speed or a relative movement speed average variance; and whether the first terminal equipment can adopt the transmission resources in the first transmission resource set for D2D communication or not is determined according to the statistical distance information and statistical relative movement speed information between the first terminal equipment and the at least one second terminal equipment and the distance threshold and relative movement speed threshold of the first transmission resource set.

Optionally, whether the first terminal equipment can adopt the transmission resources in the first transmission resource set for D2D communication or not may be determined according to the distance between the first terminal equipment and each of the at least one second terminal equipment, a relative movement speed between the first terminal equipment and each of the at least one second terminal equipment and the distance threshold and relative movement speed threshold of the first transmission resource set.

In combination with the abovementioned possible implementations, in a third possible implementation of the first aspect, the statistical distance information may include the maximum distance and the statistical relative movement speed information may include the maximum relative movement speed; and the operation that whether the first terminal equipment can adopt the transmission resources in the first transmission resource set for D2D communication or not is determined according to the statistical distance information and statistical relative movement speed information between the first terminal equipment and the at least one second terminal equipment and the distance threshold and relative movement speed threshold of the first transmission resource set may include that: when the maximum distance between the first terminal equipment and the at least one second terminal equipment is less than or equal to the distance threshold of the first transmission resource set and the maximum relative movement speed between the first terminal equipment and the at least one second terminal equipment is less than or equal to the relative movement speed threshold of the first transmission resource set, it is determined that the first terminal equipment can adopt the transmission resources in the first transmission resource set for D2D communication.

In combination with the abovementioned possible implementations, in a fourth possible implementation of the first aspect, the operation that the target transmission resource set for D2D communication of the first terminal equipment is determined from the multiple transmission resource sets according to the location information and movement speed information of the first terminal equipment and the distance thresholds and relative movement speed thresholds of the multiple transmission resource sets further may include that: responsive to a determination that the first terminal equipment does not meet the relative movement speed threshold of each of the multiple transmission resource sets, a transmission resource set corresponding to a lowest one of at least one maximum relative movement speed corresponding to at least one candidate transmission resource set is determined as the target transmission resource set for the first terminal equipment, wherein the multiple transmission resource sets may include the at least one transmission resource set, the first terminal equipment may presently meet the distance threshold of each candidate transmission resource set in the at least one candidate transmission resource set, and the maximum relative movement speed corresponding to each candidate transmission resource set may be a maximum relative movement speed between the first terminal equipment and at least one third terminal equipment adopting transmission resources in each candidate transmission resource set for D2D communication.

In combination with the abovementioned possible implementations, in a fifth possible implementation of the first aspect, the operation that the statistical relative movement speed information between the first terminal equipment and the at least one second terminal equipment is determined according to the movement speed information of the first terminal equipment and the movement speed information of each of the at least one second terminal equipment may include that: if the statistical distance information between the first terminal equipment and the at least one second terminal equipment meets the distance threshold of the first transmission resource set, the statistical relative movement speed information between the first terminal equipment and the at least one second terminal equipment is determined according to the movement speed information of the first terminal equipment and the movement speed information of each of the at least one second terminal equipment.

In combination with the abovementioned possible implementations, in a sixth possible implementation of the first aspect, the at least one second terminal equipment may specifically be all terminal equipment adopting the transmission resources in the first transmission resource set for D2D communication.

In combination with the abovementioned possible implementations, in a seventh possible implementation of the first aspect, the at least one second terminal equipment may specifically be all the other terminal equipments, except a fourth terminal equipment, of the terminal equipments adopting the transmission resources in the first transmission resource set for D2D communication, wherein the fourth terminal equipment may not meet the relative movement speed threshold of the first transmission resource set.

In combination with the abovementioned possible implementations, in an eighth possible implementation of the first aspect, the operation that the location information and movement speed information of each of the at least one second terminal equipment corresponding to the first transmission resource set are acquired may include that: a D2D broadcast message sent by each of the at least one second terminal equipment is received, the D2D broadcast message carrying the location information and movement speed information of the second terminal equipment.

In combination with the abovementioned possible implementations, in a ninth possible implementation of the first aspect, the method may further include that: it is determined that each second terminal equipment adopts the transmission resources in the first transmission resource set for D2D communication according to transmission resources occupied by the D2D broadcast message sent by each of the at least one second terminal equipment.

In combination with the abovementioned possible implementations, in a tenth possible implementation of the first aspect, the operation that the location information and movement speed information of each of the at least one second terminal equipment corresponding to the first transmission resource set are acquired may include that: a status report sent by each of the at least one second terminal equipment through a cellular communication link is received, the status report carrying the location information and movement speed information of the second terminal equipment.

In combination with the abovementioned possible implementations, in an eleventh possible implementation of the first aspect, before the operation that the target transmission resource set for D2D communication of the first terminal equipment is determined from the multiple transmission resource sets, the method may further include that: whether the first terminal equipment meets a distance threshold of a second transmission resource set is determined, wherein the first terminal equipment can adopt transmission resources in the second transmission resource set for D2D communication; and the operation that the target transmission resource set for D2D communication of the first terminal equipment is determined from the multiple transmission resource sets may include that: when the first terminal equipment does not meet the distance threshold of the second transmission resource set, the target transmission resource set for the first terminal equipment is determined from the multiple transmission resource sets.

In combination with the abovementioned possible implementations, in a twelfth possible implementation of the first aspect, after the operation that the target transmission resource set for the first terminal equipment is determined from the multiple transmission resource sets, the method may further include that: a reselection triggering moment is determined according to a present maximum distance and maximum relative movement speed between the first terminal equipment and at least one fifth terminal equipment corresponding to the target transmission resource set; and reselection of the target transmission resource set for the first terminal equipment from multiple available transmission resource sets is triggered at the reselection triggering moment.

In such case, optionally, an interval between the reselection triggering moment and a present moment may be a quotient of the distance threshold and the maximum relative movement speed.

In combination with the abovementioned possible implementations, in a twelfth possible implementation of the first aspect, after the operation that the target transmission resource set for the first terminal equipment is determined from the multiple transmission resource sets, the method may further include that: a reselection triggering moment is determined according to a present maximum distance and maximum relative movement speed between the first terminal equipment and at least one fifth terminal equipment corresponding to the target transmission resource set; and reselection of the target transmission resource set for the first terminal equipment from multiple available transmission resource sets is triggered at the reselection triggering moment.

In such case, optionally, an interval between the reselection triggering moment and a present moment may be a quotient of the distance threshold and the maximum relative movement speed.

A second aspect provides another method for determining transmission resources for D2D communication, which may include that: distance information between a first terminal equipment and at least one second terminal equipment corresponding to a first transmission resource set is acquired, wherein each of the at least one second terminal equipment can adopt transmission resources in the first transmission resource set for D2D communication, and the first transmission resource set may include at least one transmission resource block; and whether the first terminal equipment can adopt the transmission resources in the first transmission resource set for D2D communication or not is determined according to the distance information between the first terminal equipment and the at least one second terminal equipment.

In a first possible implementation of the second aspect, the distance information between the first terminal equipment and the at least one second terminal equipment corresponding to the first transmission resource set may include: statistical distance information between the first terminal equipment and the at least one second terminal equipment, wherein the statistical distance information may include at least one of a maximum distance, an average distance or a distance average variance; or a distance between the first terminal equipment and each of the at least one second terminal equipment.

In combination with the abovementioned possible implementation, in a second possible implementation of the second aspect, the operation that whether the first terminal equipment can adopt the transmission resources in the first transmission resource set for D2D communication or not is determined according to the distance information between the first terminal equipment and the at least one second terminal equipment may include that: whether the first terminal equipment can adopt the transmission resources in the first transmission resource set for D2D communication or not is determined according to the distance information and relative movement speed information between the first terminal equipment and the at least one second terminal equipment.

In combination with the abovementioned possible implementations, in a third possible implementation of the second aspect, the relative movement speed information between the first terminal equipment and the at least one second terminal equipment may include: statistical relative movement speed information between the first terminal equipment and the at least one second terminal equipment, wherein the statistical relative movement speed information may include at least one of a maximum relative movement speed, an average relative movement speed or a relative movement speed average variance; or a relative movement speed between the first terminal equipment and each of the at least one second terminal equipment.

In combination with the abovementioned possible implementations, in a fourth possible implementation of the second aspect, the operation that whether the first terminal equipment can adopt the transmission resources in the first transmission resource set for D2D communication or not is determined according to the distance information and relative movement speed information between the first terminal equipment and the at least one second terminal equipment may include that: when the maximum distance between the first terminal equipment and the at least one second terminal equipment is less than or equal to a distance threshold of the first transmission resource set and the maximum relative movement speed between the first terminal equipment and the at least one second terminal equipment is less than or equal to a relative movement speed threshold of the first transmission resource set, it is determined that the first terminal equipment can adopt the transmission resources in the first transmission resource set for D2D communication.

In combination with the abovementioned possible implementations, in a fifth possible implementation of the second aspect, the operation that the distance information between the first terminal equipment and the at least one second terminal equipment corresponding to the first transmission resource set is acquired may include that: a measurement report sent by the first terminal equipment is received, the measurement report carrying the distance information between the first terminal equipment and the at least one second terminal equipment.

A third aspect provides another method for determining transmission resources for D2D communication, which may include that: first terminal equipment acquires location information and movement speed information of the first terminal equipment; and the first terminal equipment sends a message, the message carrying the location information and movement speed information of the first terminal equipment.

In a first possible implementation of the third aspect, the operation that the first terminal equipment sends the message may include that: the first terminal equipment sends a D2D broadcast message; or the first terminal equipment sends a status report message to network equipment.

In combination with the abovementioned possible implementation, in a second possible implementation of the third aspect, when the message is the D2D broadcast message, the operation that the first terminal equipment sends the message may include that: the first terminal equipment adopts a transmission resource in a corresponding transmission resource set to send the D2D broadcast message, wherein the transmission resource set may have a corresponding distance threshold and relative movement speed threshold.

In combination with the abovementioned possible implementations, in a third possible implementation of the third aspect, the message may further contain indication information, and the indication information may be configured to indicate whether the first terminal equipment meets the relative movement speed threshold of the corresponding transmission resource set.

A fourth aspect provides a device for determining transmission resources for D2D communication, which is configured to execute the method in the first aspect or any possible implementation of the first aspect. Specifically, the device includes units configured to execute the method in the first aspect or any possible implementation of the first aspect.

A fifth aspect provides another device for determining transmission resources for D2D communication, which is configured to execute the method in the second aspect or any possible implementation of the second aspect. Specifically, the device includes units configured to execute the method in the second aspect or any possible implementation of the second aspect.

A sixth aspect provides another device for determining transmission resources for D2D communication, which is configured to execute the method in the third aspect or any possible implementation of the third aspect. Specifically, the device includes units configured to execute the method in the third aspect or any possible implementation of the third aspect.

A seventh aspect provides another device for determining transmission resources for D2D communication, which includes a storage unit and a processor, the storage unit is configured to store an instruction, the processor is configured to execute the instruction stored in the memory, and when the processor executes the instruction stored in the memory, such execution enables the processor to execute the method in the first aspect or any possible implementation of the first aspect.

An eighth aspect provides another device for determining transmission resources for D2D communication, which includes a storage unit and a processor, the storage unit is configured to store an instruction, the processor is configured to execute the instruction stored in the memory, and when the processor executes the instruction stored in the memory, such execution enables the processor to execute the method in the second aspect or any possible implementation of the second aspect.

A ninth aspect provides another device for determining transmission resources for D2D communication, which includes a storage unit and a processor, the storage unit is configured to store an instruction, the processor is configured to execute the instruction stored in the memory, and when the processor executes the instruction stored in the memory, such execution enables the processor to execute the method in the third aspect or any possible implementation of the third aspect.

A tenth aspect provides a computer-readable medium, which is configured to store a computer program, the computer program including an instruction configured to execute the method in the first aspect or any possible implementation of the first aspect.

An eleventh aspect provides another computer-readable medium, which is configured to store a computer program, the computer program including an instruction configured to execute the method in the second aspect or any possible implementation of the second aspect.

A twelfth aspect provides another computer-readable medium, which is configured to store a computer program, the computer program including an instruction configured to execute the method in the third aspect or any possible implementation of the third aspect.

BRIEF DESCRIPTION OF DRAWINGS

In order to describe the technical solutions of the embodiments of the disclosure more clearly, the drawings required to be used in descriptions about the embodiments of the disclosure or a related art will be simply introduced below. It is apparent that the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

It is to be understood that terms "system" and "network" in the disclosure may usually be exchanged for use in the disclosure. Term "and/or" in the disclosure only describes an association relationship of associated objects and represents that there may exist three relationships. For example, A and/or B may represent three conditions: independent existence of A, coexistence of A and B and independent existence of B. In addition, character "/" in the disclosure usually represents that front and back associated objects form an "or" relationship.

Figure 1:
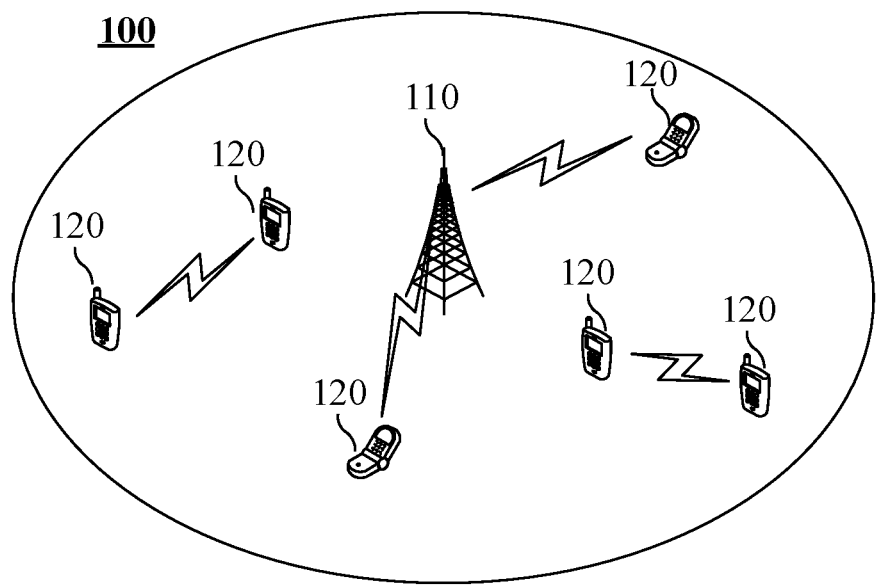
FIG. 1 is a schematic diagram of a wireless communication system applying the embodiments of the disclosure.

FIG. 1 is a schematic diagram of a wireless communication system 100 applying the embodiments of the disclosure. The wireless communication system 100 may include at least one network equipment 110. The network equipment 110 may be equipment communicating with terminal equipment. Each network equipment 110 may provide communication coverage for a specific geographical region and may communicate with terminal equipment (for example, User Equipment (UE)) located in the coverage. The network equipment 110 may be a Base Transceiver Station (BTS) in a Global System of Mobile Communication (GSM) or a Code Division Multiple Access (CDMA) system, may also be a NodeB (NB) in a Wideband Code Division Multiple Access (WCDMA) system, and may further be an Evolutional Node B (eNB or eNodeB) in an Long Term Evolution (LTE) system or a wireless controller in a Cloud Radio Access Network (CRAN), or the network equipment may be a relay station, an access point, vehicle-mounted equipment, wearable equipment, network-side equipment in a future 5th-Generation (5G) network, network equipment in a future evolved Public Land Mobile Network (PLMN) or the like.

The wireless communication system 100 further includes multiple terminal equipments 120 located in the coverage of the network equipment 110. The terminal equipment 120 may be mobile or fixed. The terminal equipment 120 may refer to an access terminal, UE, a user unit, a user station, a mobile station, a mobile radio station, a remote station, a remote terminal, mobile equipment, a user terminal, a terminal, wireless communication equipment, a user agent or a user device. The access terminal may be a cellular phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment, terminal equipment in the future 5G network, terminal equipment in the future evolved PLMN or the like.

FIG. 1 exemplarily illustrates one network equipment and six terminal equipments. Optionally, the wireless communication system 100 may include multiple network equipments and another number of terminal equipment may be included in coverage of each network equipment, which will not be limited in the embodiment of the disclosure. In addition, the wireless communication system 100 may further include another network entity such as a Mobility Management Entity (MME), a Serving Gateway (S-GW) and a Packet Data Network Gateway (P-GW). However, the embodiment of the disclosure is not limited thereto.

Specifically, the terminal equipment 120 may communicate in a cellular communication mode or a D2D communication mode, wherein, in the cellular communication mode, the terminal equipment communicates with the other terminal equipment through a cellular link with the network equipment; and in the D2D communication mode, two terminal equipments directly communicate through a D2D link.

When the terminal equipment performs D2D communication (for example, V2V communication or V2X communication), transmission resources may be autonomously selected, and the transmission resources for D2D communication may also be allocated by the network equipment. However, the embodiment of the disclosure is not limited thereto.

It is to be understood that the embodiment of the disclosure is mainly applied to a V2X communication scenario but may also be applied to any other D2D communication scenario, which will not be limited in the embodiment of the disclosure.

Figure 2:
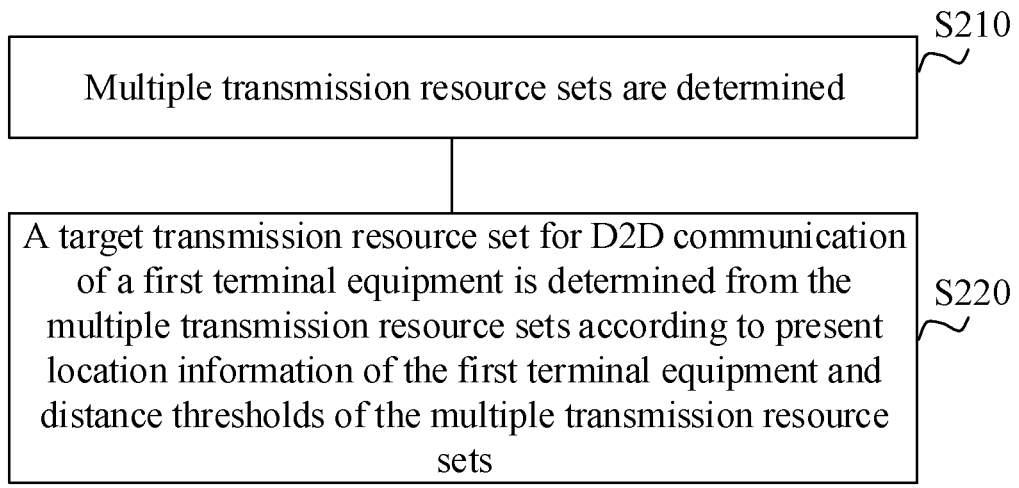
FIG. 2 is a schematic flowchart of a method for determining transmission resources for D2D communication according to an embodiment of the disclosure.

FIG. 2 schematically illustrates a method 200 for determining transmission resources for D2D communication according to an embodiment of the disclosure. The method 200 may be applied to the wireless communication system 100. However, the embodiment of the disclosure is not limited thereto.

The method 200 is adopted to determine transmission resources adopted when first terminal equipment performs D2D communication (for example, V2V communication or V2X communication), and may be executed by a device for determining the transmission resources. Optionally, the device for determining the transmission resources may be the first terminal equipment, that is, the first terminal equipment selects the transmission resources adopted for D2D communication; or, the device for determining the transmission resources may be network equipment, that is, the network equipment configures the transmission resources adopted for D2D communication of the firsts terminal equipment. However, there are no limits made in the embodiment of the disclosure.

In S210, multiple transmission resource sets are determined. Here, each of the multiple transmission resource sets includes at least one transmission resource block, and each transmission resource set has a corresponding distance threshold.

In the embodiment of the disclosure, available transmission resources may be divided into different transmission resource sets (which may also be called as transmission resource pools) according to time and/or frequencies. For example, the available transmission resources may be divided according to the time, and different transmission resource sets may correspond to different time periods; or the available transmission resources are divided according to the frequencies, and different transmission resource sets may correspond to different frequency bands; or the available transmission resources are divided according to the time and the frequencies, and different transmission resource sets may correspond to different time periods and/or frequency bands. However, the embodiment of the disclosure is not limited thereto.

In the multiple transmission resource sets, each transmission resource set may include at least one transmission resource block, and each transmission resource block may include at least one Resource Element (RE). Different transmission resource sets may include the same or different numbers of transmission resource blocks, and in addition, sizes of the transmission resource blocks included in different transmission resource sets may be the same or different. Optionally, a division manner for the available transmission resources and the transmission resources included in each transmission resource set may be predefined or configured by the network equipment, which will not be limited in the embodiment of the disclosure.

In addition, in the embodiment of the disclosure, each transmission resource set may have the corresponding distance threshold. Here, the distance threshold may be configured to represent a requirement of the transmission resource set on distances between all terminal equipment adopting the transmission resource set for D2D communication. For example, the distance threshold is configured to represent a limit made by the transmission resource set to a maximum distance between all the terminal equipment adopting the transmission resource set for D2D communication. However, the embodiment of the disclosure is not limited thereto. Optionally, the distance threshold may be a specific numerical value and may also be a numerical value range or adopt another form. In addition, the distance thresholds corresponding to the transmission resource sets may be predefined or configured by the network equipment. Here, the distance thresholds corresponding to the transmission resource sets may optionally be determined by the numbers of the transmission resources included in the transmission resource sets. However, there are no limits made in the embodiment of the disclosure.

Optionally, if the device for determining the transmission resources is the first terminal equipment, the transmission resources included in each of the multiple transmission resource sets and/or the distance threshold corresponding to each transmission resource set may be preset in the first terminal equipment and may also be notified to the first terminal equipment by the network equipment, which will not be limited in the embodiment of the disclosure.

In S220, a target transmission resource set for D2D communication of first terminal equipment is determined from multiple transmission resource sets according to location information of the first terminal equipment and the distance thresholds of the multiple transmission resource sets.

The device for determining the transmission resources may acquire the location information of the first terminal equipment. Optionally, if the device is the first terminal equipment, the first terminal equipment may acquire its own location information through a positioning system such as a Global Positioning System (GPS). However, the embodiment of the disclosure is not limited thereto.

Optionally, if the device is the network equipment, the network equipment may receive a first status report sent by the first terminal equipment, the first status report containing the location information of the first terminal equipment. Here, the first terminal equipment may actively send the first status report to the network equipment. For example, the first terminal equipment may periodically send the first status report, or the first terminal equipment may send the first status report to the network equipment when the transmission resource set for D2D transmission is required to be determined (for example, selected for the first time or reselected). Optionally, the first terminal equipment may also send the first status report to the network equipment according to indication information when receiving the indication information configured to indicate the first terminal equipment to report the location information from the network equipment. However, the embodiment of the disclosure is not limited thereto.

Optionally, whether the first terminal equipment presently meets the distance threshold of a certain transmission resource set in the multiple transmission resource sets or not may be determined according to the location information of the first terminal equipment. Here, when the first terminal equipment presently meets the distance threshold of a transmission resource set, it may be indicated that distance information between the first terminal equipment and at least one terminal equipment corresponding to the transmission resource set meets the distance threshold of the transmission resource set. Here, a corresponding relationship between a transmission resource set and terminal equipment may be configured to indicate that the terminal equipment presently adopts the transmission resources in the transmission resource set for D2D communication, and the at least one terminal equipment corresponding to the transmission resource set may specifically be all or part of terminal equipment adopting the transmission resources in the transmission resource set for communication. However, the embodiment of the disclosure is not limited thereto.

Optionally, in S220, whether the first terminal equipment presently meets the distance threshold of a first transmission resource set or not may be determined according to the location information of the first terminal equipment and the distance threshold of the first transmission resource set in the multiple transmission resource sets. Optionally, responsive to a determination that the first terminal equipment presently meets the distance threshold of the first transmission resource set, it may be determined that the first terminal equipment can adopt the transmission resources in the first transmission resource set for D2D communication. In such case, the first transmission resource set may optionally be determined as the target transmission resource set for the first terminal equipment. Alternatively, the first transmission resource set may be determined to be a candidate transmission resource set for the first terminal, and the target transmission resource set for the first terminal equipment is finally determined from at least one candidate transmission resource set included in the multiple transmission resource sets. Optionally, in another embodiment, responsive to a determination that the first terminal equipment does not meet the distance threshold of the first transmission resource set, it may be determined that the first terminal equipment presently may not adopt the transmission resources in the first transmission resource set for D2D communication and whether the first terminal equipment presently meets the distance threshold of another transmission resource set in the multiple transmission resource sets or not may further be determined until the transmission resource set of which the distance threshold is presently met by the first terminal equipment. However, the embodiment of the disclosure is not limited thereto.

In the embodiment of the disclosure, whether the first terminal equipment presently meets the distance threshold of the first transmission resource set or not may be determined in multiple manners. Optionally, location information of at least one second terminal equipment corresponding to the first transmission resource set may be acquired, statistical distance information between the first terminal equipment and the at least one second terminal equipment is determined according to the location information of the first terminal equipment and the location information of each of the at least one second terminal equipment. The statistical distance information includes at least one of a maximum distance, an average distance or a distance average variance. And whether the first terminal equipment presently meets the distance threshold of the first transmission resource set or not is determined according to the statistical distance information between the first terminal equipment and the at least one second terminal equipment and the distance threshold of the first transmission resource set. Specifically, a distance between the first terminal equipment and each second terminal equipment may be determined according to the location information of the first terminal equipment and the location information of each of the at least one second terminal equipment and the statistical distance information between the first terminal equipment and the at least one second terminal equipment is determined according to the distance between the first terminal equipment and each of the at least one second terminal equipment. However, the embodiment of the disclosure is not limited thereto.

As an optional example, the statistical distance information may include the maximum distance and the distance threshold of the first transmission resource set is specifically a distance threshold value. In such case, when the maximum distance between the first terminal equipment and the at least one second terminal equipment is less than or equal to the distance threshold value of the first transmission resource set, it may be determined that the first terminal equipment presently meets the distance threshold of the first transmission resource set. However, the embodiment of the disclosure is not limited thereto.

After the target transmission resource set for the first terminal equipment is determined, the first terminal equipment may adopt the transmission resources in the target transmission resource set for D2D communication. Here, a manner in which the first terminal equipment selects the transmission resources in the target transmission resource set for D2D communication is not limited thereto in the embodiment of the disclosure.

Therefore, according to the method for determining the transmission resources for D2D communication in the embodiment of the disclosure, the distance thresholds are defined for the transmission resource sets. And distance information between the first terminal equipment and terminal equipment presently corresponding to the transmission resource sets is determined according to the location information of the first terminal equipment. Whether the first terminal equipment can adopt the transmission resource sets for D2D or not is further determined according to the distance information, and in such a manner. The target transmission resource set for the first terminal equipment may be determined from the multiple resource sets. In addition, compared with determination of the target transmission resource set for the first terminal equipment on the basis of an absolute location of the first terminal equipment, determination of the target transmission resource set for the first terminal equipment is implemented according to distances between the first terminal equipment and the other terminal equipment in the embodiment of the disclosure. As such, frequent change of the target transmission resource set for the first terminal equipment in a scenario where a location of the first terminal equipment is changed faster (for example, the first terminal equipment is specifically a vehicle traveling fast or vehicle-mounted equipment) may be avoided, and D2D communication quality is further improved.

In addition, in a related art, when the first terminal equipment autonomously selects the transmission resource set adopted by it, it is necessary to learn about and store a corresponding relationship between a geographical location or geographical region and a transmission resource set in advance. While in the embodiment of the disclosure, the first terminal equipment selects the transmission resource set according to the distances with the other terminal equipment, and a corresponding relationship between a location or distance and a transmission resource set is not required to be stored in advance. As such, memory resources of the terminal equipment are saved.

As another optional embodiment, each transmission resource set may further have a corresponding relative movement speed threshold, and the relative movement speed threshold may be configured to represent a requirement of the transmission resource set on relative movement speeds between all terminal equipment adopting the transmission resource set for D2D communication. For example, the relative movement speed threshold is configured to represent a limit made by the transmission resource set to a maximum relative movement speed between all the terminal equipment adopting the transmission resource set for D2D communication. However, the embodiment of the disclosure is not limited thereto. Optionally, the relative movement speed threshold may be a specific numerical value and may also be a numerical value range or adopt another form. In addition, the relative movement speed thresholds corresponding to the transmission resource sets may be predefined or configured by the network equipment. Here, the relative movement speed thresholds corresponding to the transmission resource sets may be determined by the numbers of the transmission resources included in the transmission resource sets. However, there are no limits made in the embodiment of the disclosure.

Optionally, if the device for determining the transmission resources is the first terminal equipment, the relative movement speed threshold corresponding to each of the multiple transmission resource sets may be preset in the first terminal equipment and may also be notified to the first terminal equipment by the network equipment, which will not be limited in the embodiment of the disclosure.

Figure 3:
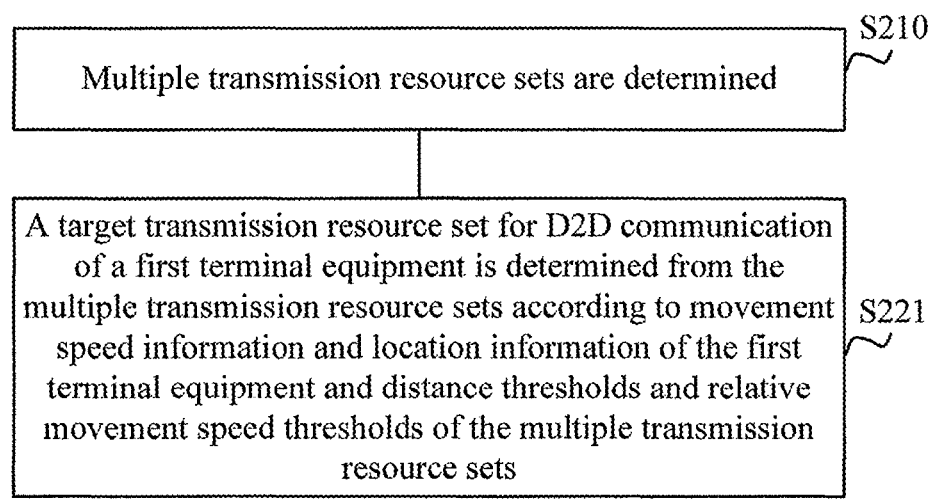
FIG. 3 is another schematic flowchart of a method for determining transmission resources for D2D communication according to an embodiment of the disclosure.

In such case, optionally, as illustrated in FIG. 3, the operation that the target transmission resource set for D2D communication of the first terminal equipment is determined from the multiple transmission resource sets according to the location information of the first terminal equipment and the distance thresholds of the multiple transmission resource sets in S220 may include the following steps.

In S221, the target transmission resource set for D2D communication of the first terminal equipment is determined from the multiple transmission resource sets according to movement speed information and location information of the first terminal equipment and the distance thresholds and relative movement speed thresholds of the multiple transmission resource sets.

Specifically, the device for determining the transmission resources may acquire the movement speed information of the first terminal equipment. Here, the movement speed information may include a movement speed vector. Optionally, if the device is the first terminal equipment, the first terminal equipment may also acquire its low location information at a first moment and a present moment, the first moment being earlier than the present moment, and determine a present movement speed of the first terminal equipment according to a time interval between the first moment and the present moment and the location information of the first terminal equipment at the first moment and the present moment. Optionally, the first terminal equipment may further acquire its own movement speeds in multiple recent time intervals and determine a present movement speed of the first terminal equipment according to the movement speeds in the multiple time intervals. However, the embodiment of the disclosure is not limited thereto.

Optionally, if the device is the network equipment, the network equipment may receive a second status report sent by the first terminal equipment, the second status report containing the movement speed information of the first terminal equipment. Here, the first terminal equipment may optionally contain the first status report and the second status report in the same message or different messages for sending, which will not be limited in the embodiment of the disclosure.

Optionally, the first terminal equipment may actively send the second status report to the network equipment. For example, the first terminal equipment may periodically send the second status report. Alternatively, the first terminal equipment may send the second status report to the network equipment when the transmission resource set for D2D transmission is required to be determined (for example, selected for the first time or reselected). Optionally, the first terminal equipment may also send the second status report to the network equipment according to indication information when receiving the indication information configured to indicate the first terminal equipment to report the movement speed information from the network equipment. However, the embodiment of the disclosure is not limited thereto.

In S221, whether the first terminal equipment presently meets a location threshold of the first transmission resource set or not may be determined according to the location information of the first terminal equipment, and whether the first terminal equipment presently meets the relative movement speed threshold of the first transmission resource set or not may be determined according to the movement speed information of the first terminal equipment. Optionally, when the first terminal equipment presently not only meets the distance threshold of the first transmission resource set but also meets the relative movement speed threshold of the first transmission resource set, it may be determined that the first terminal equipment can adopt the transmission resources of the first transmission resource set for D2D communication and the first transmission resource set may be determined to be the target transmission resource set or candidate transmission resource set for the first terminal equipment. Here, when the first terminal equipment presently meets the relative movement speed threshold of a transmission resource set, it may be indicated that a relative movement speed between the first terminal equipment and terminal equipment adopting the transmission resources of the transmission resource set for D2D communication meets the relative movement speed threshold of the transmission resource set. However, the embodiment of the disclosure is not limited thereto.

Optionally, when the first terminal equipment does not meet the distance threshold of the first transmission resource set and/or the first terminal equipment does not meet the relative movement speed threshold of the first transmission resource set, it may be determined that the first terminal equipment presently may not adopt the transmission resources of the first transmission resource set for D2D communication. However, there are no limits made in the embodiment of the disclosure.

Optionally, when whether the first terminal equipment meets the relative movement speed threshold of the first transmission resource set or not is determined, movement speed information of each of the at least one second terminal equipment may be acquired, statistical relative movement speed information between the first terminal equipment and the at least one second terminal equipment is determined according to the movement speed information of the first terminal equipment and the movement speed information of each of the at least one second terminal equipment. The statistical relative movement speed information includes at least one of a maximum relative movement speed, an average relative movement speed or a relative movement speed average variance. And whether the first terminal equipment presently meets the relative movement speed threshold of the first transmission resource set is determined according to the statistical relative movement speed information between the first terminal equipment and the at least one second terminal equipment and the relative movement speed threshold of the first transmission resource set. Specifically, a relative movement speed between the first terminal equipment and each second terminal equipment may be determined according to the movement speed information of the first terminal equipment and the movement speed information of each of the at least one second terminal equipment and the statistical relative movement speed information between the first terminal equipment and the at least one second terminal equipment is determined according to the relative movement speed between the first terminal equipment and each of the at least one second terminal equipment. For example, a movement speed vector of the first terminal equipment is $\vec{A}=(a_1, a_2)$ and a movement speed vector of the second terminal equipment is $\vec{B}=(b_1, b_2)$, where $a_1$, $a_2$, $b_1$ and $b_2$ are movement speed vectors of the first terminal equipment and the second terminal equipment in two vertical directions respectively. Then, the relative movement speed between the first terminal equipment and the second terminal equipment may be $\Delta v=|\vec{A}-\vec{B}|=\sqrt{(a_1-b_1)^2+(a_2-b_2)^2}$. However, the embodiment of the disclosure is not limited thereto.

As an optional example, the statistical relative movement speed information may include the maximum relative movement speed and the relative movement speed threshold of the first transmission resource set is specifically a relative movement speed threshold value. In such case, if the maximum relative movement speed between the first terminal equipment and the at least one second terminal equipment is less than or equal to the relative movement speed threshold value of the first transmission resource set, it may be determined that the first terminal equipment presently meets the relative movement speed threshold of the first transmission resource set. However, the embodiment of the disclosure is not limited thereto.

As an optional embodiment, in S221, whether the first terminal equipment presently meets the location threshold of the first transmission resource set and whether the relative movement speed threshold of the first transmission resource set is met or not may be determined at the same time or respectively in any sequence. As another optional embodiment, in S221, whether the first terminal equipment presently meets the distance threshold of the first transmission resource set or not may be determined at first, and if the distance threshold of the first transmission resource set is met, whether the first terminal equipment presently meets the relative movement speed threshold of the first transmission resource set or not may further be determined. On the contrary, if the distance threshold of the first transmission resource set is not met, it may directly be determined that the first terminal equipment presently may not adopt the transmission resources of the first transmission resource set for D2D communication, and the operation of determining whether the first terminal equipment presently meets the relative movement speed threshold of the first transmission resource set or not is not executed. For example, the operation of acquiring the movement speed information of the first terminal equipment and/or the at least one second terminal equipment is not executed, or the movement speed information of the first terminal equipment is acquired but the operation of determining the statistical relative movement speed information between the first terminal equipment and the at least one second terminal equipment is not executed. That is, the operation of determining whether the first terminal equipment presently meets the relative movement speed threshold of the first transmission resource set or not may be executed only when it is determined that the first terminal equipment presently meets the distance threshold of the first transmission resource set. However, the embodiment of the disclosure is not limited thereto.

In the embodiment of the disclosure, the location information and movement speed information of each of the at least one second terminal equipment may be acquired in multiple manners. As an optional embodiment, each terminal equipment may broadcast its own location information and movement speed information in a D2D broadcast message. In such case, if the device for determining the transmission resources is specifically the first terminal equipment, the first terminal equipment may receive a D2D broadcast message sent by each of the at least one second terminal equipment and acquire the location information and/or movement speed information of each second terminal equipment from the received D2D broadcast message. Optionally, each terminal equipment may also contain indication information configured to indicate the transmission resource set presently adopted for it in the D2D broadcast message. In such case, the first terminal equipment may determine the transmission resource set presently corresponding to the terminal equipment sending the D2D broadcast message according to the indication information. Or, the D2D broadcast message may also not contain the indication information, and at this moment, the first terminal equipment may determine the transmission resource set presently corresponding to the terminal equipment sending the D2D broadcast message according to transmission resources occupied by the D2D broadcast message. However, the embodiment of the disclosure is not limited thereto.

As another optional embodiment, if the device for determining the transmission resources is the network equipment, the network equipment may receive a status report sent by each of the at least one second terminal equipment, the status report sent by each second terminal equipment containing the location information and/or movement speed information of the second terminal equipment. Here, the second terminal equipment may periodically send the status report and may also send the status report to the network equipment according to indication information when receiving the indication information configured to indicate the second terminal equipment to report the location information and/or the indication information for the movement speed information from the network equipment. However, the embodiment of the disclosure is not limited thereto.

As an optional embodiment, if the transmission resource set of which the distance threshold and relative movement speed threshold are presently met by the first terminal equipment is determined to be a candidate transmission resource set for the first terminal equipment, whether the first terminal equipment presently meets the distance threshold and relative movement speed threshold of each transmission resource set in the other transmission resource sets or not may be determined in a similar manner, and the transmission resource sets of which the distance thresholds and relative movement speed thresholds are met by the first terminal equipment in the multiple transmission resource sets are determined to be candidate transmission resource sets.

Optionally, if a number of the candidate transmission resource sets in the multiple transmission resource sets is only one, the first terminal equipment may determine the candidate transmission resource set as the target transmission resource set for the first terminal equipment. Optionally, if the number of the candidate transmission resource sets in the multiple transmission resource sets is multiple, that is, it is determined that the first terminal equipment may adopt the transmission resources of at least two transmission resource sets in the multiple transmission resource sets for D2D communication, the target transmission resource set for the first terminal equipment may be determined from the at least two transmission resource sets according to statistical distance information corresponding to the at least two transmission resource sets respectively. Here, the statistical distance information corresponding to a transmission resource set may indicate statistical distance information between the first terminal equipment and at least one terminal equipment adopting the transmission resource set for D2D communication. For example, if the statistical distance information includes a maximum distance, the transmission resource set corresponding to the smallest maximum distance in the at least two transmission resource sets may be determined as the target transmission resource set for the first terminal equipment. However, the embodiment of the disclosure is not limited thereto.

As another optional embodiment, if it is determined that there exists no transmission resource set which may presently be adopted for D2D communication of the first terminal equipment in the multiple transmission resource sets, the target transmission resource set for the first terminal equipment may be determined from the multiple transmission resource sets according to the statistical distance information corresponding to each of the multiple transmission resource sets. For example, a second transmission resource set in the multiple transmission resource sets may be determined as the target transmission resource set for the first terminal equipment. Here, the statistical distance information corresponding to the second transmission resource set meets the distance threshold of the second transmission resource set. Optionally, if a number of the second transmission resource set is multiple, one of the multiple second transmission resource sets may be randomly selected as the target transmission resource set for the first terminal equipment, or the target transmission resource set for the first terminal equipment may also be determined from the multiple second transmission resource sets according to statistical relative movement speed information corresponding to each second transmission resource set in the multiple second transmission resource sets. For example, the second transmission resource set corresponding to a lowest maximum relative movement speed in the multiple second transmission resources may be determined as the target transmission resource set for the first terminal equipment. However, the embodiment of the disclosure is not limited thereto.

From the above, it can be seen that there may exist the condition that one or more terminal equipments not meeting the relative movement speed threshold of the first transmission resource set presently adopt the first transmission resource set for D2D communication. In such case, optionally, the first terminal equipment may exclude the special terminal equipment when the target transmission resource set is determined. For example, the at least one second terminal equipment may specifically be all other terminal equipment except fourth terminal equipment in terminal equipment adopting the transmission resources in the first transmission resource set for D2D communication. Here, the fourth terminal equipment does not meet the relative movement speed threshold of the first transmission resource set. For example, a maximum relative movement speed between the fourth terminal equipment and all the other terminal equipment is higher than the relative movement speed threshold of the first transmission resource set. However, the embodiment of the disclosure is not limited thereto.

Optionally, in the embodiment of the disclosure, the terminal equipment may also contain indication information configured to indicate whether it meets the relative movement speed threshold of the corresponding transmission resource set in the D2D broadcast message. Here, the indication information may occupy one or more bits. In such a manner, the other terminal equipment may determine whether to consider the terminal equipment according to the D2D broadcast message when the target transmission resource is selected. However, the embodiment of the disclosure is not limited thereto.

Optionally, if the device for determining the transmission resources is the network equipment, after the target transmission resource set for the first terminal equipment is determined, the network equipment may further send indication information configured to indicate the target transmission resource set or the transmission resources in the target transmission resource set to the first terminal equipment, and the first terminal equipment may determine the transmission resources adopted for D2D communication according to the indication information. However, the embodiment of the disclosure is not limited thereto.

Optionally, in the embodiment of the disclosure, the transmission resource set for D2D communication of the first terminal equipment may further be updated. For example, the location information of the first terminal equipment is periodically acquired and whether the first terminal equipment still meets the distance threshold of the presently adopted transmission resource set or not is determined; or the movement speed information of the first terminal equipment may further be acquired and whether the first terminal equipment still meets the relative movement speed threshold of the presently adopted transmission resource set or not is determined. Optionally, when the first terminal equipment still meets the requirement of the presently adopted transmission resource set, the first terminal equipment may continue adopting the transmission resources in the present transmission resource set for D2D communication; and if NO, transmission resource set reselection may be initiated.

Or, transmission resource set reselection may also be initiated under triggering of an event. For example, when D2D communication quality of the first terminal equipment is lower than a certain threshold value or indication information configured to trigger transmission resource set reselection is received from the network equipment, the first terminal equipment may initiate transmission resource set reselection, or, the network equipment may reselect a transmission resource set for the first terminal equipment when receiving a reselection request sent by the first terminal equipment. However, the embodiment of the disclosure is not limited thereto.

In the embodiment of the disclosure, the method 200 may be applied to first transmission resource set selection for D2D communication of the first terminal equipment and may also be applied to transmission resource set reselection. Optionally, whether the first terminal equipment presently meets a distance threshold of a third transmission resource set presently corresponding to the first terminal equipment or not may be determined before S220, and when it is determined that the first terminal equipment does not meet the distance threshold of the third transmission resource set, S220 is executed. Or, when it is determined that the first terminal equipment presently meets the distance threshold of the third transmission resource set, whether the first terminal equipment presently meets a relative movement speed threshold of the third transmission resource set or not may further be determined, and when it is determined that the first terminal equipment does not meet the relative movement speed threshold of the third transmission resource set, S220 is executed. There are no limits made in the embodiment of the disclosure.

As another optional embodiment, after the target transmission resource set for the first terminal equipment is determined, reselection of the transmission resource set adopted by the first terminal equipment may be triggered according to present statistical distance information and statistical relative movement speed information between the first terminal equipment and at least one fifth terminal equipment corresponding to the target transmission resource set. Optionally, a reselection triggering moment may be determined according to a present maximum distance and maximum relative movement speed between the first terminal equipment and the at least one fifth terminal equipment corresponding to the target transmission resource set or according to the distance threshold and maximum relative movement speed of the target transmission resource set. For example, a time interval between the reselection triggering moment and the present moment is D/C. Here, D is the present maximum distance between the first terminal equipment and the at least one fifth terminal equipment, and C is the present maximum relative movement speed between the first terminal equipment and the at least one fifth terminal equipment; or, the time interval between the reselection triggering moment and the present moment may be $D_0/C$. Here, $D_0$ is the distance threshold of the target transmission resource set. Then, reselection of the target transmission resource set for the first terminal equipment from multiple available transmission resource sets may be triggered at the reselection triggering moment. However, the embodiment of the disclosure is not limited thereto.

It is to be understood that, in the embodiment of the disclosure, at least one terminal equipment corresponding to a transmission resource set may specifically refer to all terminal equipment adopting the transmission resource set for D2D communication, or specifically refers to part of terminal equipment adopting the transmission resource set for D2D communication. Here, optionally, the part of terminal equipment may specifically be the other terminal equipment except terminal equipment not meeting the relative movement speed threshold of the transmission resource set in all the terminal equipment. However, the embodiment of the disclosure is not limited thereto.

In the embodiment of the disclosure, the distance threshold and relative movement speed threshold are defined for each transmission resource set, and the transmission resource set for D2D communication of the terminal equipment is determined from the multiple transmission resource set according to the location information and movement speed information of the terminal equipment and the distance threshold and relative movement speed threshold of each transmission resource set, so that efficiency of resource allocation for D2D communication and D2D communication quality may be improved.

Figure 4:
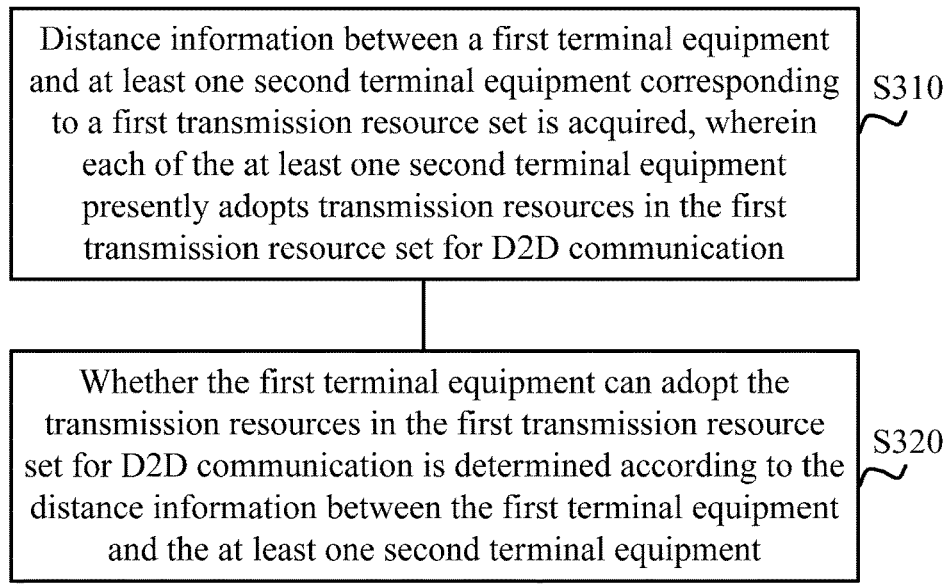
FIG. 4 is a schematic flowchart of another method for determining transmission resources for D2D communication according to an embodiment of the disclosure.

FIG. 4 illustrates another method 300 for determining transmission resources for D2D communication according to an embodiment of the disclosure. The method 300 may be adopted to determine transmission resources adopted when first terminal equipment performs D2D communication. Optionally, the method 300 may still be executed by the first terminal equipment or network equipment.

In S310, distance information between the first terminal equipment and at least one second terminal equipment corresponding to a first transmission resource set is acquired. Here, each of the at least one second terminal equipment presently adopts transmission resources in the first transmission resource set for D2D communication, and the first transmission resource set includes at least one transmission resource block.

Optionally, the distance information between the first terminal equipment and the at least one second terminal equipment corresponding to the first transmission resource set includes statistical distance information between the first terminal equipment and the at least one second terminal equipment, wherein the statistical distance information includes at least one of a maximum distance, an average distance or a distance average variance; or a distance between the first terminal equipment and each of the at least one second terminal equipment.

As an optional embodiment, if a device for determining the transmission resources is the network equipment, the network equipment may receive a measurement report sent by the first terminal equipment, the measurement report carrying the distance information between the first terminal equipment and the at least one second terminal equipment. In such case, the network equipment may acquire the distance information between the first terminal equipment and the at least one second terminal equipment from the measurement report.

As another optional embodiment, the network equipment may receive a status report sent by the first terminal equipment. Here, the status report may contain location information of the first terminal equipment. In such case, the network equipment may acquire location information of each of the at least one second terminal equipment and determine the distance information between the first terminal equipment and the at least one second terminal equipment according to the location information of the first terminal equipment and the location information of each of the at least one second terminal equipment. For example, the status report sent by the first terminal equipment further contains the location information of each of the at least one second terminal equipment, or, the network equipment may further receive a status report sent by each of the at least one second terminal equipment. However, the embodiment of the disclosure is not limited thereto.

As another optional embodiment, if the distance information between the first terminal equipment and the at least one second terminal equipment corresponding to the first transmission resource set includes the statistical distance information between the first terminal equipment and the at least one second terminal equipment, the network equipment may optionally receive a measurement report sent by the first terminal equipment, and the measurement report may contain a distance between the first terminal equipment and each of the at least one second terminal equipment. In such case, the network equipment may determine the statistical distance information between the first terminal equipment and the at least one second terminal equipment according to the distance between the first terminal equipment and each of the at least one second terminal equipment.

As another optional embodiment, if the device for determining the transmission resources is the first terminal equipment, the first terminal equipment may acquire the location information of each of the at least one terminal equipment and determine the distance information between the first terminal equipment and the at least one second terminal equipment according to the location information of the first terminal equipment and the location information of each of the at least one second terminal equipment. However, the embodiment of the disclosure is not limited thereto.

In S320, whether the first terminal equipment can adopt the transmission resources in the first transmission resource set for D2D communication or not is determined according to the distance information between the first terminal equipment and the at least one second terminal equipment.

As an optional embodiment, in S320, whether the first terminal equipment presently meets a distance threshold of the first transmission resource set or not may be determined according to the distance information between the first terminal equipment and the at least one second terminal equipment.

Optionally, responsive to a determination that the first terminal equipment presently meets the distance threshold of the first transmission resource set, it may be determined that the first terminal equipment can adopt the transmission resources in the first transmission resource set for D2D communication. In such case, optionally, the first transmission resource set may be determined to be a target transmission resource set for the first terminal equipment; or, the first transmission resource set may be determined to be a candidate transmission resource set for the first terminal equipment, and the target transmission resource set for the first terminal equipment is finally determined from at least one candidate transmission resource set included in multiple transmission resource sets.

As another optional embodiment, in S320, whether the first terminal equipment can adopt the transmission resources in the first transmission resource set for D2D communication or not may be determined according to the distance information between the first terminal equipment and the at least one second terminal equipment and relative movement speed information between the first terminal equipment and the at least one second terminal equipment. Optionally, the relative movement speed information between the first terminal equipment and the at least one second terminal equipment includes statistical relative movement speed information between the first terminal equipment and the at least one second terminal equipment, wherein the statistical relative movement speed information includes at least one of a maximum relative movement speed, an average relative movement speed or a relative movement speed average variance; or a relative movement speed between the first terminal equipment and each of the at least one second terminal equipment. However, the embodiment of the disclosure is not limited thereto.

In such case, optionally, whether the first terminal equipment presently meets a location threshold of the first transmission resource set or not may be determined according to the distance information between the first terminal equipment and the at least one second terminal equipment, and whether the first terminal equipment presently meets a relative movement speed threshold of the first transmission resource or not is determined according to the relative movement speed information between the first terminal equipment and the at least one second terminal equipment. Optionally, when the first terminal equipment presently not only meets the distance threshold of the first transmission resource set but also meets the relative movement speed threshold of the first transmission resource set, it may be determined that the first terminal equipment can adopt the transmission resources of the first transmission resource set for D2D communication, and the first transmission resource set may be determined to be the target transmission resource sett or candidate transmission resource set for the first terminal equipment. However, the embodiment of the disclosure is not limited thereto.

As an optional embodiment, the statistical distance information includes the maximum distance and the statistical relative movement speed information includes the maximum relative movements peed. In such case, when the maximum distance between the first terminal equipment and the at least one second terminal equipment is less than or equal to the distance threshold of the first transmission resource set and the maximum relative movement speed between the first terminal equipment and the at least one second terminal equipment is less than or equal to the relative movement speed threshold of the first transmission resource set, it may be determined that the first terminal equipment can adopt the transmission resources in the first transmission resource set for D2D communication.

In the embodiment of the disclosure, the distance threshold and the relative movement speed threshold are defined for the first transmission resource set, and whether the first terminal equipment can adopt the transmission resources in the first transmission resource set for D2D communication or not is determined according to the statistical distance information and statistical relative movement speed information between the terminal equipment and the at least one second terminal equipment corresponding to the first transmission resource set, so that efficiency of resource allocation for D2D communication and D2D communication quality may be improved.

An embodiment of the disclosure provides another method for determining transmission resources for D2D communication, which includes that: first terminal equipment acquires location information and movement speed information of the first terminal equipment; and the first terminal equipment sends a message, the message carrying the location information and movement speed information of the first terminal equipment.

Optionally, the operation that the first terminal equipment sends the message may include that: the first terminal equipment sends a D2D broadcast message; or the first terminal equipment sends a status report message to network equipment.

In such a manner, the equipment receiving the message may determine a transmission resource set adopted when the first terminal equipment or other terminal equipment performs D2D communication according to the location information and movement speed information of the first terminal equipment.

As an optional embodiment, when the message is the D2D broadcast message, the first terminal equipment may optionally adopt a transmission resource in a corresponding transmission resource set to send the D2D broadcast message. Here, the transmission resource set has a corresponding distance threshold and relative movement speed threshold. In such a manner, the terminal equipment receiving the D2D broadcast message may determine the transmission resource set presently corresponding to the first terminal equipment according to the transmission resource occupied by the D2D broadcast message.

As another optional embodiment, the message further contains indication information, and the indication information indicates whether the first terminal equipment meets the relative movement speed threshold of the corresponding transmission resource set.

Figure 5:
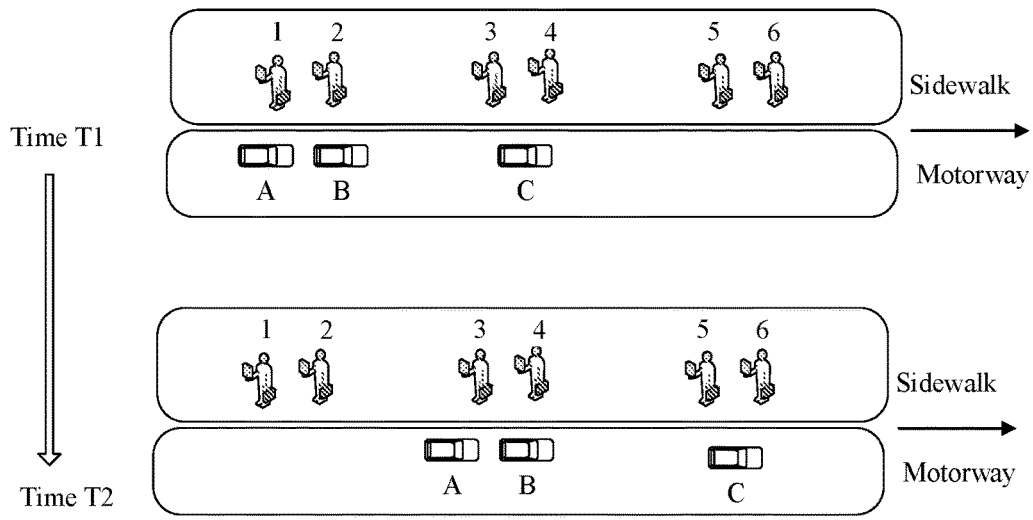
FIG. 5 is a schematic diagram of an application scenario example of a method for determining transmission resources for D2D communication according to an embodiment of the disclosure.

FIG. 5 schematically illustrates an application scenario example according to an embodiment of the disclosure. Here, in the scenario, terminal equipment held by pedestrians on a sidewalk may perform D2D communication with other terminal equipment, and meanwhile, vehicle-mounted terminal equipment traveling on a motorway may perform V2X communication with other terminal equipment. Here, at a moment T1, the pedestrian 1, the pedestrian 2, a vehicle A and a vehicle B are near, the pedestrian 3, the pedestrian 4 and a vehicle C are near and the pedestrian 5 and the pedestrian 6 are near. In such case, if transmission resource sets adopted for the terminal equipment are determined according to distances between the terminal equipment and the other terminal equipment, the terminal equipment at shorter distances may correspond to the same time-frequency resource set, so that a mutual discovery probability of the terminal equipment at the shorter distances may be effectively increased, and a near-far effect may be avoided, that is, the condition that signals sent by the other terminal equipment at the shorter distances far away from the terminal equipment are drowned in signals sent by the other terminal equipment at longer distances far away from the terminal equipment due to the fact that the same transmission resource set is allocated to the multiple terminal equipments at the longer distances is avoided.

However, traveling speeds of the vehicles are far higher than traveling speeds of the pedestrians, so that relative locations between each vehicle and pedestrian are greatly changed at a moment T2 at a shorter interval with the moment T1, and at this moment, the transmission resource set corresponding to each terminal equipment is required to be regulated to avoid frequent determination of the transmission resource sets corresponding to the terminal equipment due to the near-far effect. In such case, location information and movement speed information of the terminal equipment, i.e., distances and relative movement speeds between the terminal equipment and the other terminal equipment, may be considered at the same time of determining the transmission resource sets, multiple vehicle-mounted terminal equipments at shorter distances may correspond to the same transmission resource set and multiple handheld terminal equipments at shorter distances may correspond to the same transmission resource set, so that occurrence of the abovementioned condition is avoided.

It is to be understood that a sequence number of each process does not mean an execution sequence and the execution sequence of each process should be determined by its function and an internal logic and should not form any limit to an implementation process of the embodiments of the disclosure.

The method for determining the transmission resources for D2D communication according to the embodiments of the disclosure is described above in detail in combination with FIG. 1 to FIG. 5, and a device for determining transmission resources for D2D communication according to the embodiments of the disclosure will be described below in detail in combination with FIG. 6 to FIG. 11.

Figure 6:
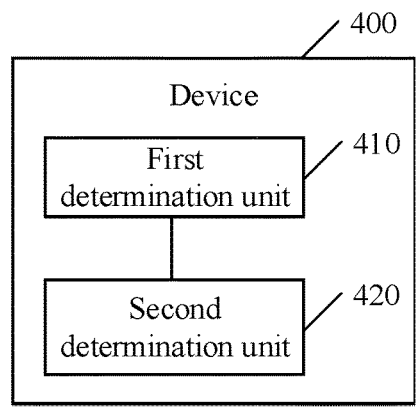
FIG. 6 is a schematic block diagram of a device for determining transmission resources for D2D communication according to an embodiment of the disclosure.

FIG. 6 schematically illustrates a device 400 for determining transmission resources for D2D communication according to an embodiment of the disclosure. The device 400 includes a first determination unit 410 and a second determination unit 420.

The first determination unit 410 is configured to determine multiple transmission resource sets, wherein each of the multiple transmission resource sets includes at least one transmission resource block, and each transmission resource set has a corresponding distance threshold.

The second determination unit 420 is configured to determine a target transmission resource set for D2D communication of first terminal equipment from the multiple transmission resource sets according to location information of the first terminal equipment and the distance thresholds of the multiple transmission resource sets determined by the first determination unit 410.

Optionally, each of the multiple transmission resource sets further has a corresponding relative movement speed threshold. In such case, the second determination unit 420 is specifically configured to: determine the target transmission resource set for D2D communication of the first terminal equipment from the multiple transmission resource sets according to the location information and movement speed information of the first terminal equipment and the distance thresholds and relative movement speed thresholds of the multiple transmission resource sets.

Optionally, the second determination unit 420 is specifically configured to:

acquire location information and movement speed information of each of at least one second terminal equipment corresponding to a first transmission resource set, each of the at least one second terminal equipment adopting transmission resources in the first transmission resource set for D2D communication and the multiple transmission resource sets including the first transmission resource set;

determine statistical distance information between the first terminal equipment and the at least one second terminal equipment according to the location information of the first terminal equipment and the location information of each of the at least one second terminal equipment, wherein the statistical distance information includes at least one of a maximum distance, an average distance or a distance average variance;

determine statistical relative movement speed information between the first terminal equipment and the at least one second terminal equipment according to the movement speed information of the first terminal equipment and the movement speed information of each of the at least one second terminal equipment, wherein the statistical relative movement speed information includes at least one of a maximum relative movement speed, an average relative movement speed or a relative movement speed average variance; and determine whether the first terminal equipment can adopt the transmission resources in the first transmission resource set for D2D communication according to the statistical distance information and statistical relative movement speed information between the first terminal equipment and the at least one second terminal equipment and the distance threshold and relative movement speed threshold of the first transmission resource set.

Optionally, the statistical distance information includes the maximum distance and the statistical relative movement speed information includes the maximum relative movement speed. In such case, the second determination unit 420 is specifically configured to: when the maximum distance between the first terminal equipment and the at least one second terminal equipment is less than or equal to the distance threshold of the first transmission resource set and the maximum relative movement speed between the first terminal equipment and the at least one second terminal equipment is less than or equal to the relative movement speed threshold of the first transmission resource set, determine that the first terminal equipment can adopt the transmission resources in the first transmission resource set for D2D communication.

Optionally, the second determination unit 420 is specifically configured to: responsive to a determination that the first terminal equipment does not meet the relative movement speed threshold of each of the multiple transmission resource sets, determine a transmission resource set corresponding to a lowest one of at least one maximum relative movement speed corresponding to at least one candidate transmission resource set as the target transmission resource set for the first terminal equipment, wherein the multiple transmission resource sets include the at least one transmission resource set, the first terminal equipment meets the distance threshold of each of the at least one candidate transmission resource set, and the maximum relative movement speed corresponding to each candidate transmission resource set is a maximum relative movement speed between the first terminal equipment and at least one third terminal equipment adopting transmission resources in each candidate transmission resource set for D2D communication.

Optionally, the second determination unit 420 is specifically configured to: if the statistical distance information between the first terminal equipment and the at least one second terminal equipment meets the distance threshold of the first transmission resource set, determine the statistical relative movement speed information between the first terminal equipment and the at least one second terminal equipment according to the movement speed information of the first terminal equipment and the movement speed information of each of the at least one second terminal equipment.

Optionally, the at least one second terminal equipment includes all terminal equipment adopting the transmission resources in the first transmission resource set for D2D communication.

Optionally, the at least one second terminal equipment includes all the other terminal equipments, except a fourth terminal equipment, of the terminal equipments adopting the transmission resources in the first transmission resource set for D2D communication, wherein the fourth terminal equipment does not meet the relative movement speed threshold of the first transmission resource set.

Optionally, the device 400 further includes a receiving unit 430, configured to receive a D2D broadcast message sent by each of the at least one second terminal equipment, the D2D broadcast message carrying the location information and movement speed information of the second terminal equipment; and correspondingly, the second determination unit 420 is specifically configured to determine the location information and movement speed information of each second terminal equipment according to the D2D broadcast message received by the receiving unit 430.

Optionally, the second determination unit 420 is further configured to determine that each second terminal equipment adopts the transmission resources in the first transmission resource set for D2D communication according to transmission resources occupied by the D2D broadcast message sent by each of the at least one second terminal equipment.

Optionally, the device 400 further includes a receiving unit 430, configured to receive a status report sent by each of the at least one second terminal equipment through a cellular communication link, the status report carrying the location information and movement speed information of the second terminal equipment; and correspondingly, the second determination unit 420 is specifically configured to determine the location information and movement speed information of each second terminal equipment according to the status report received by the receiving unit 430.

Optionally, the second determination unit 420 is further configured to, before the target transmission resource set for D2D communication of the first terminal equipment is determined from the multiple transmission resource sets, determine whether the first terminal equipment meets a distance threshold of a second transmission resource set, wherein the first terminal equipment is adopting transmission resources in the second transmission resource set for D2D communication.

The second determination unit 420 is specifically configured to, when the first terminal equipment does not meet the distance threshold of the second transmission resource set, determine the target transmission resource set for the first terminal equipment from the multiple transmission resource sets.

Optionally, the second determination unit 420 is further configured to:

after the target transmission resource set for the first terminal equipment is determined from the multiple transmission resource sets, determine a reselection triggering moment according to a present maximum distance and maximum relative movement speed between the first terminal equipment and at least one fifth terminal equipment corresponding to the target transmission resource set; and trigger reselection of the target transmission resource set for the first terminal equipment from multiple available transmission resource sets at the reselection triggering moment.

In an optional example, the device 400 may specifically be the device for determining the transmission resources in the abovementioned embodiments, for example, the network equipment or the first terminal equipment, and the device 400 may be configured to execute each flow and/or step in the method embodiments and will not be elaborated herein to avoid repetitions.

Figure 7:
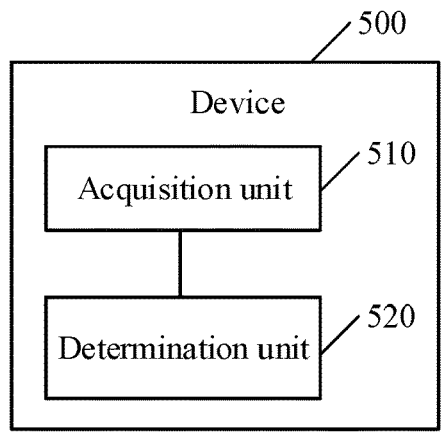
FIG. 7 is a schematic block diagram of another device for determining transmission resources for D2D communication according to an embodiment of the disclosure.

FIG. 7 schematically illustrates a device 500 for determining transmission resources for D2D communication according to another embodiment of the disclosure. The device 500 includes an acquisition unit 510 and a determination unit 520.

The acquisition unit 510 is configured to acquire distance information between a first terminal equipment and at least one second terminal equipment corresponding to a first transmission resource set, wherein each of the at least one second terminal equipment presently adopts transmission resources in the first transmission resource set for D2D communication, and the first transmission resource set includes at least one transmission resource block.

The determination unit 520 is configured to determine whether the first terminal equipment can adopt the transmission resources in the first transmission resource set for D2D communication according to the distance information, acquired by the acquisition unit 510, between the first terminal equipment and the at least one second terminal equipment.

Optionally, the distance information between the first terminal equipment and the at least one second terminal equipment corresponding to the first transmission resource set includes statistical distance information between the first terminal equipment and the at least one second terminal equipment, wherein the statistical distance information includes at least one of a maximum distance, an average distance or a distance average variance; or a distance between the first terminal equipment and each of the at least one second terminal equipment.

Optionally, the determination unit 520 is specifically configured to: determine whether the first terminal equipment can adopt the transmission resources in the first transmission resource set for D2D communication according to the distance information and relative movement speed information between the first terminal equipment and the at least one second terminal equipment.

Optionally, the relative movement speed information between the first terminal equipment and the at least one second terminal equipment includes statistical relative movement speed information between the first terminal equipment and the at least one second terminal equipment, wherein the statistical relative movement speed information includes at least one of a maximum relative movement speed, an average relative movement speed or a relative movement speed average variance; or a relative movement speed between the first terminal equipment and each of the at least one second terminal equipment.

Optionally, the determination unit 520 is specifically configured to: when the maximum distance between the first terminal equipment and the at least one second terminal equipment is less than or equal to a distance threshold of the first transmission resource set and the maximum relative movement speed between the first terminal equipment and the at least one second terminal equipment is less than or equal to a relative movement speed threshold of the first transmission resource set, determine that the first terminal equipment can adopt the transmission resources in the first transmission resource set for D2D communication.

Optionally, the acquisition unit 510 is specifically configured to: receive a measurement report sent by the first terminal equipment, the measurement report carrying the distance information between the first terminal equipment and the at least one second terminal equipment.

In an optional example, the device 500 may specifically be the device for determining the transmission resources in the abovementioned embodiments, for example, the network equipment or the first terminal equipment, and the device 500 may be configured to execute each flow and/or step in the method embodiments and will not be elaborated herein to avoid repetitions.

Figure 8:
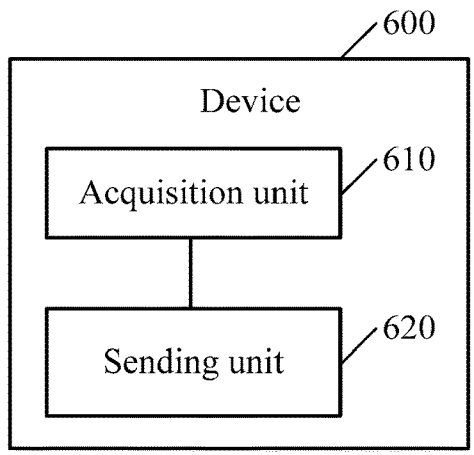
FIG. 8 is a schematic block diagram of another device for determining transmission resources for D2D communication according to an embodiment of the disclosure.

FIG. 8 schematically illustrates a device 600 for determining transmission resources for D2D communication according to another embodiment of the disclosure. The device 600 includes an acquisition unit 610 and a sending unit 620.

The acquisition unit 610 is, configured to acquire location information and movement speed information of the device; and The sending unit 620 is configured to send a message, the message carrying the location information and movement speed information acquired by the acquisition unit 610.

Optionally, the sending unit 620 is specifically configured to: send a D2D broadcast message; or send a status report message to network equipment.

Optionally, when the message is the D2D broadcast message, the sending unit 620 is specifically configured to adopt a transmission resource in a corresponding transmission resource set to send the D2D broadcast message, wherein the transmission resource set has a corresponding distance threshold and relative movement speed threshold.

Optionally, the message further contains indication information, and the indication information indicates whether the first terminal equipment meets the relative movement speed threshold of the corresponding transmission resource set.

In an optional example, the device 600 may specifically be the first terminal equipment in the abovementioned embodiments, and the device 600 may be configured to execute each flow and/or step in the method embodiments and will not be elaborated herein to avoid repetitions.

It is to be understood that all of the device 400, the device 500 and the device 600 are implemented in form of functional unit. Term "unit" mentioned herein may refer to an Application Specific Integrated Circuit (ASIC), an electronic circuit, a processor (for example, a shared processor, a dedicated processor or a group processor) configured to execute one or more software or firmware programs, a memory, a combined logic circuit and/or another proper component supporting the described functions.

Figure 9:
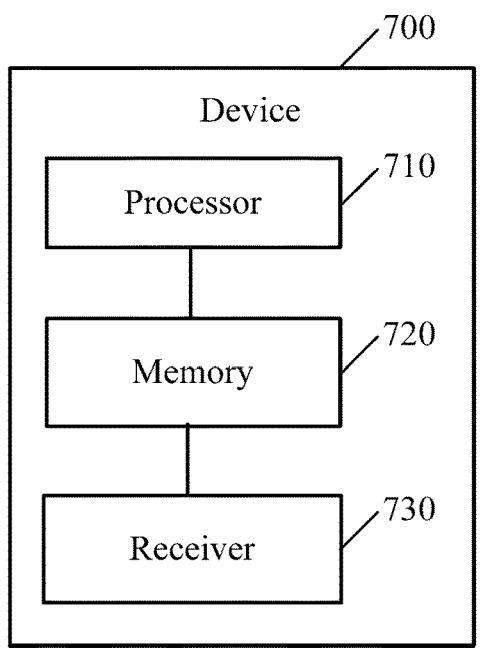
FIG. 9 is a schematic block diagram of another device for determining transmission resources for D2D communication according to an embodiment of the disclosure.

FIG. 9 schematically illustrates a device 700 for determining transmission resources for D2D communication according to an embodiment of the disclosure. The device 700 includes a processor 710 and a memory 720, wherein the memory 720 is configured to store an instruction, and the processor 710 is configured to execute the instruction stored in the memory 720. Specifically, the processor 710 is configured to:

determine multiple transmission resource sets, wherein each of the multiple transmission resource sets includes at least one transmission resource block, and each transmission resource set has a corresponding distance threshold; and determine a target transmission resource set for D2D communication of first terminal equipment from the multiple transmission resource sets according to location information of the first terminal equipment and the distance thresholds of the multiple transmission resource sets.

Optionally, as illustrated in FIG. 9, the device 700 further includes a receiver 730, configured to receive a D2D broadcast message sent by each of at least one second terminal equipment, the D2D broadcast message containing location information and movement speed information of the corresponding second terminal equipment; and correspondingly, the processor 710 is specifically configured to determine the location information and movement speed information of each second terminal equipment according to the D2D broadcast message received by the receiver 730.

Optionally, the device 700 further includes a receiver 730, configured to receive a status report sent by each of the at least one second terminal equipment through a cellular communication link, the status report carrying the location information and movement speed information of the second terminal equipment; and correspondingly, the processor 710 is specifically configured to determine the location information and movement speed information of each second terminal equipment according to the status report received by the receiver 730.

In an optional example, the device 700 may specifically be the device for determining the transmission resources in the abovementioned embodiments, for example, the network equipment or the first terminal equipment, and the device 700 may be configured to execute each flow and/or step in the method embodiments. Optionally, the memory 720 may include a Read-Only Memory (ROM) and a Random Access Memory (RAM), and provides the instruction and data for the processor. A part of the memory 720 may further include a nonvolatile RAM. For example, the memory 720 may further store information of an equipment type. The processor 710 may be configured to execute the instruction stored in the memory 720, and when the processor 710 executes the instruction stored in the memory 720, the processor 710 is configured to execute each step and/or flow of the method embodiments.

Figure 10:
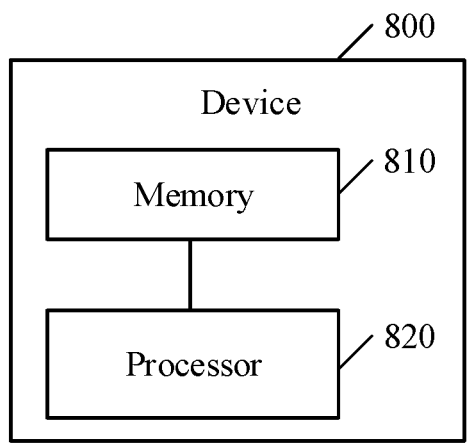
FIG. 10 is a schematic block diagram of another device for determining transmission resources for D2D communication according to an embodiment of the disclosure.

FIG. 10 schematically illustrates a device 800 for determining transmission resources for D2D communication according to another embodiment of the disclosure. The device 800 includes a memory 810 and a processor 820, wherein the memory 810 is configured to store an instruction, and the processor 820 is configured to execute the instruction stored in the memory 810. Specifically, the processor 820 is configured to:

acquire distance information between a first terminal equipment and at least one second terminal equipment corresponding to a first transmission resource set, wherein each of the at least one second terminal equipment presently adopts transmission resources in the first transmission resource set for D2D communication, and the first transmission resource set includes at least one transmission resource block; and determine whether the first terminal equipment can adopt the transmission resources in the first transmission resource set for D2D communication according to the distance information between the first terminal equipment and the at least one second terminal equipment.

Optionally, the device 800 further includes a receiver, configured to receive a measurement report sent by the first terminal equipment, the measurement report carrying the distance information between the first terminal equipment and the at least one second terminal equipment; and correspondingly, the processor is specifically configured to acquire the distance information between the first terminal equipment and the at least one second terminal equipment from the measurement report received by the receiver.

In an optional example, the device 800 may specifically be the device for determining the transmission resources in the abovementioned embodiments, for example, the network equipment or the first terminal equipment, and the device 800 may be configured to execute each flow and/or step in the method embodiments and will not be elaborated herein to avoid repetitions.

In an optional example, the device 800 may specifically be the device for determining the transmission resources in the abovementioned embodiments, for example, the network equipment or the first terminal equipment, and the device 800 may be configured to execute each flow and/or step in the method embodiments. Optionally, the memory 810 may include a ROM and a RAM, and provides the instruction and data for the processor. A part of the memory 810 may further include a nonvolatile RAM. For example, the memory 810 may further store information of an equipment type. The processor 820 may be configured to execute the instruction stored in the memory 810, and when the processor 820 executes the instruction stored in the memory 810, the processor 820 is configured to execute each step and/or flow of the method embodiments.

Figure 11:
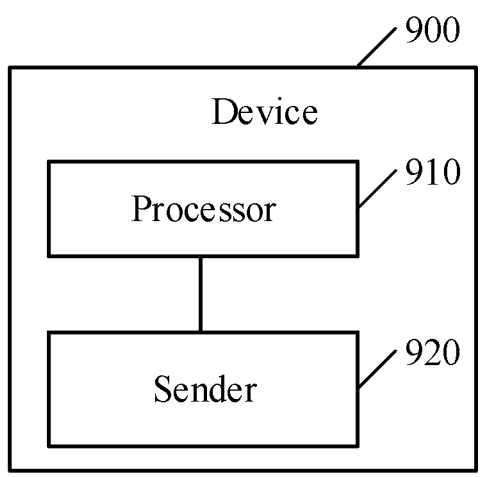
FIG. 11 is a schematic block diagram of another device for determining transmission resources for D2D communication according to an embodiment of the disclosure.

FIG. 11 schematically illustrates a device 900 for determining transmission resources for D2D communication according to another embodiment of the disclosure. The device 900 includes a processor 910 and a sender 920.

The processor 910 is configured to acquire location information and movement speed information of the device.

The sender 920 is configured to send a message, the message carrying the location information and movement speed information acquired by the processor 910.

In an optional example, the device 900 may specifically be the first terminal equipment in the abovementioned embodiments, and may be configured to execute each flow and/or step in the method embodiments. Optionally, the device 900 may further include a memory, and the memory may include a ROM and a RAM, and provides an instruction and data for the processor. A part of the memory may further include a nonvolatile RAM. For example, the memory may further store information of an equipment type. The processor may be configured to execute the instruction stored in the memory, and when the processor executes the instruction stored in the memory, the processor is configured to execute each step and/or flow of the method embodiments.

It is to be understood that, in the abovementioned embodiments, the processor may be a Central Processing Unit (CPU), and the processor may also be another universal processor, a Digital Signal Processor (DSP), an ASIC, a Field-Programmable Gate Array (FPGA) or another programmable logic device, discrete gate or transistor logical device and discrete hardware component. The universal processor may be a microprocessor or the processor may also be any conventional processor and the like.

In the implementation process, each step of the methods may be completed by an integrated logic circuit of hardware in the universal processor or an instruction in a software form. The steps of the methods disclosed in combination with the embodiments of the disclosure may directly be embodied to be completed by a hardware processor or executed and completed by a combination of hardware and software modules in the processor. The software module may be located in a mature storage medium in this art such as a RAM, a flash memory, a ROM, a programmable ROM or electrically erasable programmable ROM and a register. The storage medium is located in the memory, and the processor executes the instruction in the memory to complete the steps of the methods in combination with hardware. For avoiding repetitions, no more detailed descriptions will be made herein.

It is to be understood that, for simplicity, the descriptions about the embodiments of the disclosure focus on emphasizing differences between each embodiment and the same or similar parts may refer to each other.

Those of ordinary skilled in the art may realize that each method step and unit described in combination with the embodiments disclosed in the disclosure may be implemented by electronic hardware, computer software or a combination of the two. For clearly describing exchangeability of hardware and software, the steps and composition of each embodiment have been generally described in the descriptions made before according to functions. Whether these functions are executed in a hardware or software manner depends on specific applications and design constraints of the technical solutions. Those of ordinary skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each function unit in each embodiment of the disclosure may be integrated into a processing unit, each unit may also exist independently, and two or more than two units may also be integrated into a unit. The integrated unit may be implemented in a hardware form and may also be implemented in form of software function unit.

When being implemented in form of software function unit and sold or used as an independent product, the integrated unit may be stored in a computer-readable storage medium. Based on such an understanding, the technical solutions of the disclosure substantially or parts making contributions to a related art or all or part of the technical solutions may be embodied in form of software product, and the computer software product is stored in a storage medium, including a plurality of instructions configured to enable a computer equipment (which may be a personal computer, a server, network equipment or the like) to execute all or part of the steps of the method in each embodiment of the disclosure. The storage medium includes various media capable of storing program codes such as a U disk, a mobile hard disk, a ROM, a RAM, a magnetic disk or an optical disk.

The above is only the specific implementation of the disclosure and not intended to limit the scope of protection of the disclosure. Various equivalent variations or replacements may be apparent to those skilled in the art within the technical scope disclosed by the disclosure, and all of these modifications or replacements shall fall within the scope of protection of the disclosure. Therefore, the scope of protection of the disclosure shall be subject to the scope of protection of the claims.

The invention claimed is:

1. A method for determining transmission resources for Device to Device (D2D) communication, comprising:
   determining a plurality of transmission resource sets, wherein each of the plurality of transmission resource sets comprises at least one transmission resource block, and each transmission resource set has a corresponding distance threshold; and
   wherein each of the plurality of transmission resource sets further has a corresponding relative movement speed threshold; and
   acquiring location information and movement speed information of each of at least one second terminal equipment corresponding to a first transmission resource set, each of the at least one second terminal equipment adopting transmission resources in the first transmission resource set for D2D communication and the plurality of transmission resource sets comprising the first transmission resource set;
   determining statistical distance information between the first terminal equipment and the at least one second terminal equipment according to the location information of the first terminal equipment and the location information of each of the at least one second terminal equipment, wherein the statistical distance information comprises at least one of a maximum distance, an average distance or a distance average variance;
   if the statistical distance information between the first terminal equipment and the at least one second terminal equipment meets the distance threshold of the first transmission resource set, determining the statistical relative movement speed information between the first terminal equipment and the at least one second terminal equipment according to the movement speed information of the first terminal equipment and the movement speed information of each of the at least one second terminal equipment, wherein the statistical relative movement speed information comprises at least one of a maximum relative movement speed, an average relative movement speed or a relative movement speed average variance; and
   determining whether the first terminal equipment can adopt the transmission resources in the first transmission resource set for D2D communication according to the statistical distance information and statistical relative movement speed information between the first terminal equipment and the at least one second terminal equipment and the distance threshold and relative movement speed threshold of the first transmission resource set.

2. The method as claimed in claim 1, wherein the statistical distance information comprises the maximum distance and the statistical relative movement speed information comprises the maximum relative movement speed; and
   determining whether the first terminal equipment can adopt the transmission resources in the first transmission resource set for D2D communication according to the statistical distance information and statistical relative movement speed information between the first terminal equipment and the at least one second terminal equipment and the distance threshold and relative movement speed threshold of the first transmission resource set comprises:
   when the maximum distance between the first terminal equipment and the at least one second terminal equipment is less than or equal to the distance threshold of the first transmission resource set and the maximum relative movement speed between the first terminal equipment and the at least one second terminal equipment is less than or equal to the relative movement speed threshold of the first transmission resource set, determining that the first terminal equipment can adopt the transmission resources in the first transmission resource set for D2D communication, and wherein determining the target transmission resource set for D2D communication of the first terminal equipment from the plurality of transmission resource sets according to the location information and movement speed information of the first terminal equipment and the distance thresholds and relative movement speed thresholds of the plurality of transmission resource sets further comprises:

responsive to a determination that the first terminal equipment does not meet the relative movement speed threshold of each of the plurality of transmission resource sets, determining a transmission resource set corresponding to a lowest one of at least one maximum relative movement speed corresponding to at least one candidate transmission resource set as the target transmission resource set for the first terminal equipment, wherein the plurality of transmission resource sets comprise the at least one candidate transmission resource set, the first terminal equipment meets the distance threshold of each of the at least one candidate transmission resource set, and the maximum relative movement speed corresponding to each candidate transmission resource set is a maximum relative movement speed between the first terminal equipment and at least one third terminal equipment adopting transmission resources in each candidate transmission resource set for D2D communication.

3. The method as claimed in claim 1, wherein the at least one second terminal equipment comprises all terminal equipment adopting the transmission resources in the first transmission resource set for D2D communication.

4. The method as claimed in claim 1, wherein the at least one second terminal equipment comprises all the other terminal equipment, except a fourth terminal equipment, of the terminal equipment adopting the transmission resources in the first transmission resource set for D2D communication, wherein the fourth terminal equipment does not meet the relative movement speed threshold of the first transmission resource set.

5. The method as claimed in claim 1, wherein acquiring the location information and movement speed information of each of the at least one second terminal equipment corresponding to the first transmission resource set comprises:

receiving a D2D broadcast message sent by each of the at least one second terminal equipment, the D2D broadcast message carrying the location information and movement speed information of the second terminal equipment, wherein the method further comprises:

determining that each second terminal equipment adopts the transmission resources in the first transmission resource set for D2D communication according to transmission resources occupied by the D2D broadcast message sent by each of the at least one second terminal equipment.

6. The method as claimed in claim 1, wherein acquiring the location information and movement speed information of each of the at least one second terminal equipment corresponding to the first transmission resource set comprises:

receiving a status report sent by each of the at least one second terminal equipment through a cellular communication link, the status report carrying the location information and movement speed information of the second terminal equipment.

7. The method as claimed in claim 1, further comprising:

before determining the target transmission resource set for D2D communication of the first terminal equipment from the plurality of transmission resource sets, determining whether the first terminal equipment meets a distance threshold of a second transmission resource set, wherein the first terminal equipment is adopting transmission resources in the second transmission resource set for D2D communication, wherein determining the target transmission resource set for D2D communication of the first terminal equipment from the plurality of transmission resource sets comprises:

when the first terminal equipment does not meet the distance threshold of the second transmission resource set, determining the target transmission resource set for the first terminal equipment from the plurality of transmission resource sets.

8. The method as claimed in claim 1, further comprising:

after determining the target transmission resource set for the first terminal equipment from the plurality of transmission resource sets, determining a reselection triggering moment according to a present maximum distance and maximum relative movement speed between the first terminal equipment and at least one fifth terminal equipment corresponding to the target transmission resource set; and triggering reselection of the target transmission resource set for the first terminal equipment from a plurality of available transmission resource sets at the reselection triggering moment.

9. A device for determining transmission resources for Device to Device (D2D) communication, comprising:

a processor, a memory and a receiver, wherein the memory is configured to store instructions, and when the instructions stored in the memory are executed by the processor, the processor is configured to determine a plurality of transmission resource sets, wherein each of the plurality of transmission resource sets comprises at least one transmission resource block, and each transmission resource set has a corresponding distance threshold; and wherein each of the plurality of transmission resource sets further has a corresponding relative movement speed threshold, and the processor is specifically configured to:

acquire location information and movement speed information of each of at least one second terminal equipment corresponding to a first transmission resource set, each of the at least one second terminal equipment adopting transmission resources in the first transmission resource set for D2D communication and the plurality of transmission resource sets comprising the first transmission resource set;

determine statistical distance information between the first terminal equipment and the at least one second terminal equipment according to the location information of the first terminal equipment and the location information of each of the at least one second terminal equipment, wherein the statistical distance information comprises at least one of a maximum distance, an average distance or a distance average variance;

if the statistical distance information between the first terminal equipment and the at least one second terminal equipment meets the distance threshold of the first transmission resource set, determining the statistical relative movement speed information between the first terminal equipment and the at least one second terminal equipment according to the movement speed information of the first terminal equipment and the movement speed information of each of the at least one second terminal equipment, wherein the statistical relative movement speed information comprises at least one of a maximum relative movement speed, an average relative movement speed or a relative movement speed average variance; and determine whether the first terminal equipment can adopt the transmission resources in the first transmission resource set for D2D communication according to the statistical distance information and statistical relative movement speed information between the first terminal equipment and the at least one second terminal equipment and the distance threshold and relative movement speed threshold of the first transmission resource set.

10. The device as claimed in claim 9, wherein the processor is specifically configured to:

when the maximum distance between the first terminal equipment and the at least one second terminal equipment is less than or equal to the distance threshold of the first transmission resource set and the maximum relative movement speed between the first terminal equipment and the at least one second terminal equipment is less than or equal to the relative movement speed threshold of the first transmission resource set, determine that the first terminal equipment can adopt the transmission resources in the first transmission resource set for D2D communication.

11. The device as claimed in claim 9, wherein the at least one second terminal equipment comprises all terminal equipment adopting the transmission resources in the first transmission resource set for D2D communication.

12. The device as claimed in claim 9, wherein the at least one second terminal equipment comprises all the other terminal equipment, except a fourth terminal equipment, of the terminal equipment adopting the transmission resources in the first transmission resource set for D2D communication, wherein the fourth terminal equipment does not meet the relative movement speed threshold of the first transmission resource set.

13. The device as claimed in claim 9, wherein the processor is further configured to:

obtain a D2D broadcast message sent by each of the at least one second terminal equipment, the D2D broadcast message carrying the location information and movement speed information of the second terminal equipment, wherein the processor is specifically configured to determine the location information and movement speed information of each second terminal equipment according to the D2D broadcast message received by the receiver.

14. The device as claimed in claim 9, wherein the processor is further configured to determine that each second terminal equipment adopts the transmission resources in the first transmission resource set for D2D communication according to transmission resources occupied by the D2D broadcast message sent by each of the at least one second terminal equipment.

15. The device as claimed in claim 9, wherein the processor is further configured to:

obtain a status report sent by each of the at least one second terminal equipment through a cellular communication link, the status report carrying the location information and movement speed information of the second terminal equipment, wherein the processor is specifically configured to determine the location information and movement speed information of each second terminal equipment according to the status report received by the receiver.

16. A non-transitory computer-readable storage medium, having computer program instructions thereon, wherein when the computer program instructions are executed by a processor, the processor is configured to perform:

determining a plurality of transmission resource sets, wherein each of the plurality of transmission resource sets comprises at least one transmission resource block, and each transmission resource set has a corresponding distance threshold; and wherein each of the plurality of transmission resource sets further has a corresponding relative movement speed threshold; and acquiring location information and movement speed information of each of at least one second terminal equipment corresponding to a first transmission resource set, each of the at least one second terminal equipment adopting transmission resources in the first transmission resource set for D2D communication and the plurality of transmission resource sets comprising the first transmission resource set;

determining statistical distance information between the first terminal equipment and the at least one second terminal equipment according to the location information of the first terminal equipment and the location information of each of the at least one second terminal equipment, wherein the statistical distance information comprises at least one of a maximum distance, an average distance or a distance average variance;

if the statistical distance information between the first terminal equipment and the at least one second terminal equipment meets the distance threshold of the first transmission resource set, determining the statistical relative movement speed information between the first terminal equipment and the at least one second terminal equipment according to the movement speed information of the first terminal equipment and the movement speed information of each of the at least one second terminal equipment, wherein the statistical relative movement speed information comprises at least one of a maximum relative movement speed, an average relative movement speed or a relative movement speed average variance; and determining whether the first terminal equipment can adopt the transmission resources in the first transmission resource set for D2D communication according to the statistical distance information and statistical relative movement speed information between the first terminal equipment and the at least one second terminal equipment and the distance threshold and relative movement speed threshold of the first transmission resource set.

17. The non-transitory computer-readable storage medium as claimed in claim 16, wherein the statistical distance information comprises the maximum distance and the statistical relative movement speed information comprises the maximum relative movement speed; and determining whether the first terminal equipment can adopt the transmission resources in the first transmission resource set for D2D communication according to the statistical distance information and statistical relative movement speed information between the first terminal equipment and the at least one second terminal equipment and the distance threshold and relative movement speed threshold of the first transmission resource set comprises:

when the maximum distance between the first terminal equipment and the at least one second terminal equipment is less than or equal to the distance threshold of the first transmission resource set and the maximum relative movement speed between the first terminal equipment and the at least one second terminal equipment is less than or equal to the relative movement speed threshold of the first transmission resource set, determining that the first terminal equipment can adopt the transmission resources in the first transmission resource set for D2D communication, and wherein determining the target transmission resource set for D2D communication of the first terminal equipment from the plurality of transmission resource sets according to the location information and movement speed information of the first terminal equipment and the distance thresholds and relative movement speed thresholds of the plurality of transmission resource sets further comprises:

responsive to a determination that the first terminal equipment does not meet the relative movement speed threshold of each of the plurality of transmission resource sets, determining a transmission resource set corresponding to a lowest one of at least one maximum relative movement speed corresponding to at least one candidate transmission resource set as the target transmission resource set for the first terminal equipment, wherein the plurality of transmission resource sets comprise the at least one candidate transmission resource set, the first terminal equipment meets the distance threshold of each of the at least one candidate transmission resource set, and the maximum relative movement speed corresponding to each candidate transmission resource set is a maximum relative movement speed between the first terminal equipment and at least one third terminal equipment adopting transmission resources in each candidate transmission resource set for D2D communication.

18. The non-transitory computer-readable storage medium as claimed in claim 16, wherein the at least one second terminal equipment comprises all terminal equipment adopting the transmission resources in the first transmission resource set for D2D communication.

19. The non-transitory computer-readable storage medium as claimed in claim 16, wherein the at least one second terminal equipment comprises all the other terminal equipment, except a fourth terminal equipment, of the terminal equipment adopting the transmission resources in the first transmission resource set for D2D communication, wherein the fourth terminal equipment does not meet the relative movement speed threshold of the first transmission resource set.

20. The non-transitory computer-readable storage medium as claimed in claim 16, wherein acquiring the location information and movement speed information of each of the at least one second terminal equipment corresponding to the first transmission resource set comprises:

receiving a D2D broadcast message sent by each of the at least one second terminal equipment, the D2D broadcast message carrying the location information and movement speed information of the second terminal equipment, wherein the method further comprises:

determining that each second terminal equipment adopts the transmission resources in the first transmission resource set for D2D communication according to transmission resources occupied by the D2D broadcast message sent by each of the at least one second terminal equipment.

* * * * *